(12) United States Patent
Babaei

(10) Patent No.: US 11,877,238 B2
(45) Date of Patent: Jan. 16, 2024

(54) POWER SAVING FOR MULTICAST BROADCAST SERVICES

(71) Applicant: Parsa Wireless Communications LLC, Stamford, CT (US)

(72) Inventor: Alireza Babaei, Fairfax, VA (US)

( * ) Notice: Subject to any disclaimer, the term of this patent is extended or adjusted under 35 U.S.C. 154(b) by 0 days.

(21) Appl. No.: 17/704,985

(22) Filed: Mar. 25, 2022

(65) Prior Publication Data
US 2022/0312318 A1  Sep. 29, 2022

Related U.S. Application Data

(60) Provisional application No. 63/167,153, filed on Mar. 29, 2021.

(51) Int. Cl.
H04W 52/02 (2009.01)
H04W 84/12 (2009.01)
H04L 5/00 (2006.01)

(52) U.S. Cl.
CPC ....... *H04W 52/0219* (2013.01); *H04L 5/0048* (2013.01); *H04W 52/0229* (2013.01)

(58) Field of Classification Search
CPC .......... H04W 52/0219; H04W 52/0229; H04L 5/0048; Y02D 30/70
USPC .......................................................... 370/311
See application file for complete search history.

(56) References Cited

U.S. PATENT DOCUMENTS

| 6,771,670 | B1 | 8/2004 | Pfahler |
| 2010/0266063 | A1 | 10/2010 | Harel |
| 2017/0303157 | A1* | 10/2017 | Siomina .................. H04W 4/06 |
| 2019/0182632 | A1 | 6/2019 | Fujishiro |
| 2019/0386771 | A1* | 12/2019 | Liu .......................... H04L 1/003 |
| 2020/0077458 | A1 | 3/2020 | Stauffer |
| 2020/0091978 | A1 | 3/2020 | Noh |
| 2020/0350969 | A1 | 11/2020 | Shimezawa |
| 2020/0396591 | A1 | 12/2020 | Ou |

(Continued)

FOREIGN PATENT DOCUMENTS

| CN | 110832787 A | * | 2/2020 | .......... H04B 7/0456 |
| CN | 111294789 A | | 6/2020 | |

(Continued)

OTHER PUBLICATIONS

Apple (R1-1804770, "discussion on beam measurement and reporting" Apr. 16-20, 2018) (Year: 2018).*

(Continued)

*Primary Examiner* — Maharishi V Khirodhar
(74) *Attorney, Agent, or Firm* — John F. Vadopia Esq.

(57) ABSTRACT

A method of power saving in multicast broadcast services (MBS) communications includes determining, by a user equipment (UE) and based on channel measurements; at least one of: whether to resume transmitting paused uplink feedback or to stop transmitting uplink feedback associated with MBS data and whether to switch a periodicity associated with the uplink feedback; and transmitting or stopping transmitting of the uplink feedback based on the determining. The uplink feedback may be one of hybrid automatic repeat request (HARQ) feedback or channel state information (CSI) report. Transmitting the uplink feedback may be based on a physical uplink control channel (PUCCH). Preferably, the user equipment (UE) is in a radio resource control (RRC) connected state.

20 Claims, 20 Drawing Sheets

(56) References Cited

U.S. PATENT DOCUMENTS

| | | |
|---|---|---|
| 2020/0413301 A1 | 12/2020 | Shi |
| 2021/0099324 A1 | 4/2021 | Choi |
| 2021/0105055 A1* | 4/2021 | Chae .............. H04L 1/0026 |
| 2021/0105126 A1* | 4/2021 | Yi .................. H04W 72/21 |
| 2021/0259040 A1 | 8/2021 | Babaei |
| 2021/0274525 A1 | 9/2021 | Wei |
| 2021/0410180 A1 | 12/2021 | Tsai |
| 2022/0060923 A1 | 2/2022 | Zheng |

FOREIGN PATENT DOCUMENTS

| | | | |
|---|---|---|---|
| CN | 111866791 A * | 10/2020 | ........ H04L 1/1812 |
| EP | 2389034 B1 | 3/2011 | |
| EP | 3509343 A1 | 1/2019 | |
| EP | 3509343 A1 * | 7/2019 | ........ H04B 7/0626 |
| WO | 2015169371 A1 | 11/2015 | |
| WO | 2016141514 A1 | 9/2016 | |
| WO | 2016196044 A1 | 12/2016 | |
| WO | 2017086843 A1 | 5/2017 | |
| WO | 2020167747 A1 | 8/2020 | |
| WO | 2020220233 A1 | 11/2020 | |
| WO | 2020247043 A1 | 12/2020 | |
| WO | 2021033085 A1 | 2/2021 | |
| WO | 2021078357 A1 | 4/2021 | |
| WO | WO-2021078357 A1 * | 4/2021 | ........ H04W 16/225 |
| WO | 2021098074 A1 | 5/2021 | |
| WO | 2021152405 A1 | 8/2021 | |
| WO | 2021163527 A1 | 8/2021 | |
| WO | 2021228406 A1 | 11/2021 | |
| WO | WO-2021228406 A1 * | 11/2021 | |
| WO | 2022078804 A1 | 4/2022 | |
| WO | WO-2022078804 A1 * | 4/2022 | |
| WO | WO-2022150751 A1 * | 7/2022 | |

OTHER PUBLICATIONS

GPP TSG RAN Meeting #88-e; RP-201038; Revised Work Item on NR Multicast and Broadcast Services (2013); Huwai; Jun. 29, 2020.
3GPP TS 36.300; 3rd Generation Partnership Project; Technical Specification Group Radio Access Network; NR; Radio Resource Control (RRC) protocol specification (Release 16) (Jun. 2021).
3GPP TS 38.331;3rd Generation Partnership Project; Technical Specification Group Radio Access Network; NR; Medium Access Control (MAC) protocol specification (Release 16); (Dec. 2020).
3GPP TSG WG1 Meeting #103-E; Intel Corp., Sidelink Enhancements for UE Power Saving; R1-2008998; Oct. 26, 2020.
3GPP TSG RAN WG1 #106-e; Interdigital Inc.; Sidelink Resourse Allocation for Power Saving; R1-2108035; Aug. 16, 2021.
3GPP TSG RAN WG2 Meeting of #114-e; Report from email discussion [AT114-e][027][QoE] Start and Stop (Lenovo); May 19, 2021.
Scheffel, et al.; WSN Data Confidence Attribution Using Predictors; 2018 Eighth Latin American Symposium on Dependable Computing (LADC); 2018.
3GPP_TS_28_404; 3rd Generation Partnership Project; Technical Solution Group Services and System Aspects; Mar. 27, 2020.
3GPP TSG RAN WG2 Meeting # 114-e; Further Discussion on QoE Measurement Collection in NR Standalone; R2_2105214; May 19, 2021.
3GPP TSG RAN WG2 Meeting # 114; Change Request; R2_2106554; May 19, 2021.
3GPP TSG-RAN WG3 #112-e; ZTE, China Telecom; TP for TS 38.300 Introduce NR QoE; May 17, 2021.
3GPP TR 38.890; Apr. 2021; Study on NR QoE Management and Optimizations for Diverse Services; Release 17; Apr. 9, 2021.
3GPP TSG RAN WG1 #105-e; Feature Lead Summary # 5 on RAN basic functions for broadcast/multicast for UEs in RRC_IDLE/ RRC_Inactive States; May 10, 2021.
3GPP YSG-RAN WG2 Meeting #112-e; Qualcomm;NR Multicast-Broadcast Services and Configuration for UEs in Different RRC States; R2_2009038; Nov. 2, 2020.
3GPP YSG-RAN WG2 Meeting #111 Electronic; Scope and Architecture Analysis of NR MBS; R2_2007442; Aug. 17, 2020.
3GPP TSG-RAN WG2 Meeting #113e; Futurewei; Discussion on NR MBS Solutions of Mode 2 Delivery; R2-2100631; Jan. 25, 2021.
3GPP TSG-RAN WG2 Meeting #114-e; MBA MAC Layer and Group Scheduling Aspects; R2-2104876; May 19, 2021.
3GPP TSG-RAN WG2 Meeting #113bis electronic; Discussion on QoE Measurement Pausing and Resuming; R2-2103146; Apr. 2021.
3GPP TSG RAN WG1 #102-e Meeting; On Basic Functions for Broadcast/Multicast for RRC_IDLE/RRC_INACTIVE UEs; R1-2006175; Aug. 17, 2020.
3GPP TR 23.757; Study on Architectural Enhancements for 5G Multicast-Broadcast Services (Release 17); Mar. 2021.
3GPP FSG-RAN WG2 Meeting #111 electronic; Overview of NR MBS; R2-20070033; Aug. 18, 2020.
3GPP TSG-RAN WG2 Meeting #113-bis-e; ZTE Corp.; Discussion on Pause/Resume NR QoE Reporting; R2-2104271; Apr. 12, 2021.
3GPP TSG-RAN WG2 Meeting 113bis-e; Multicast Session Reception in RRC Inactive; R2-2103907; Apr. 12, 2021.
3GPP TSG RAN WG1 #105-e; Intel Corp.; NR MBS Group Scheduling for RRC_Connected UEs; R1-2104928; May 19, 2021.
3GPP TSG-RAN WG2 Meeting #113bis Electronic; QoE Reporting Control by RAN Awareness on QoE Parameter; R2-2103556; Apr. 12, 2021.
3GPP TSG-RAN WG2 Meeting #112-e; ZTE; Discussion on QoE in NR; R2-2010476; Nov. 2, 2020.
3GPP TSG-RAN WG2 Meeting #112-e; Nokia; Analysis of Solutions for Paging Collision; R2-2009264; Nov. 2, 2020.
3GPP TSG RAN WG2 #113bis; Ericsson; Configuration and Reporting for QoE Management; R2-2103049; Apr. 12, 2021.
3GPP TSG-RAN WG2 Meeting #97; Change Request; R2-1702256; Feb. 13, 2017.
3GPP TSG RAN WG1 Meeting #92bis; Apple; Discussion on Beam Measurement and Reporting; R1-1804770; Apr. 16, 2018.

* cited by examiner

| Transport channel  Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel  Logical channel | UL-SCH | RACH |
|---|---|---|
| CCCH | X | |
| DCCH | X | |
| DTCH | X | |

FIG. 3B

| Transport channel  Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

POWER SAVING FOR MULTICAST BROADCAST SERVICES

CROSS-REFERENCE TO RELATED APPLICATIONS

This application claims priority under 35 USC § 119(e) from U.S. Provisional Patent Application No. 63/167,153, filed on Mar. 29, 2021 ("the provisional application"); the content of the provisional patent application is incorporated herein by reference.

BACKGROUND OF THE INVENTION

The present invention is directed to 5G, which is the 5th generation mobile network. It is a new global wireless standard after 1G, 2G, 3G, and 4G networks. 5G enables networks designed to connect machines, objects and devices.

The invention includes providing various capabilities for optimizing power saving for user equipments (UEs) with multicast broadcast services (MBS) sessions, particularly where the UE has a capability to receive 5G MBS in all radio resource control (RRC) states. Inventive example embodiments enhance the power saving for MBS data reception by optimizing uplink feedback periodicities and/or resuming/stopping of uplink feedback and/or RRC state transitioning to limit the amount of uplink feedback and enhance power saving.

SUMMARY OF THE INVENTION

In an embodiment, the invention provides a method of power saving in multicast broadcast services (MBS) communications, including determining, by a user equipment (UE) and based on channel measurements; at least one of: whether to resume transmitting paused uplink feedback or to stop transmitting uplink feedback associated with MBS data and whether to switch a periodicity associated with the uplink feedback; and transmitting or stopping transmitting of the uplink feedback based on the determining. The uplink feedback may be one of hybrid automatic repeat request (HARQ) feedback or channel state information (CSI) report. Transmitting the uplink feedback may be based on a physical uplink control channel (PUCCH). Preferably, the user equipment (UE) is in a radio resource control (RRC) connected state.

The method may include switching to a higher uplink feedback periodicity in response to a channel robustness metric indicating improved channel conditions based on the channel measurements. The method may include switching to a lower uplink feedback periodicity in response to a channel robustness metric indicating degraded channel conditions based on the channel measurements. Stopping the uplink feedback may occur further in response to a channel robustness metric indicating improved channel conditions based on the channel measurements. Stopping the uplink feedback may include resuming the uplink feedback is further in response to a channel robustness metric indicating degraded channel conditions based on the channel measurements. Preferably, the channel robustness metric comprises one of a received signal received power (RSRP) and received signal received quality (RSRQ).

The method may include that the channel measurements are performed at the user equipment (UE) and that the determining is autonomously made at the UE. The method may include receiving, by the user equipment (UE) from a base station (BS), one or more configuration parameters indicating one or more triggering conditions, wherein the determining is based on the channel measurements and the one or more triggering conditions. The one or more triggering conditions are based on at least one of: comparing a received signal received power (RSRP) with a first threshold, comparing a received signal received quality (RSRQ) with a second threshold and comparing an expected battery life of the user equipment (UE) with a third threshold.

The one or more configuration parameters may indicate at least one of the first threshold, the second threshold and the third threshold. The method can further include monitoring, by the user equipment (UE), for the one or more triggering conditions. The monitoring may include measuring one or more reference signals, receiving reference signal configuration parameters of the one or more reference signals, or both. For that matter, the method may further include transmitting, by the user equipment (UE) to a base station (BS), an indication of the determining to switch the periodicity of the uplink feedback, stopping transmitting of the uplink feedback or resuming transmission of the uplink feedback. The indication may be transmitted via a physical uplink control channel, via a radio resource control (RRC) message, or both. The determining may be based on an indication from a base station (BS).

The method can further include receiving the indication via downlink signaling. The downlink signaling may be based on one or more radio resource control (RRC) messages. The channel measurements are at least based on one of sounding reference signal (SRS) measurement and channel state information (CSI) report. The determining may be further based on a power headroom report (PHR), or further based on at least one of uplink loading and signaling congestion, or both. The channel measurements may include radio resource management (RRM) measurements. The method can include receiving configuration parameters of a plurality of sets of physical uplink control channel (PUCCH) resource sets, and wherein a first PUCCH resource set, in the plurality of PUCCH resource sets, is associated with a first periodicity. Transmitting the uplink feedback is via the first PUCCH resource set based on determining to switch an uplink feedback periodicity to the first periodicity.

The method also can include receiving configuration parameters of physical uplink control channel (PUCCH) indicating a plurality of PUCCH resources, wherein the transmitting of the uplink feedback may include selecting first PUCCH resources, of the PUCCH resources, based on a determined periodicity of the uplink feedback. Selecting the first physical uplink control channel (PUCCH) resources may include selecting one out of every N PUCCH resource associated with the configuration parameters of the PUCCH, where is an integer number based on the determined periodicity of the uplink feedback.

In another embodiment, the invention provides a method of power saving in multicast broadcast services (MBS) communications, including determining, by a user equipment (UE) in a radio resource control (RRC) connected state, to transition to an RRC inactive state for reception of MBS data, wherein the determining is based on channel measurements, transitioning to the RRC inactive state in response to the determining and receiving the MBS data in the RRC inactive state. The method may include receiving, by the user equipment (UE) from a base station (BS): one or more first configuration parameters for determining one or more robustness metrics and one or more triggers; and determining to transition to the RRC inactive state is based on the one or more robustness metrics and the one or more triggers. The method may also include that the one or more triggers comprise one or more first thresholds and the determining to transition to the RRC inactive state is based on comparing the one or more robustness metrics with the one or more first thresholds. The one or more robustness metrics comprise at least one of received signal received power (RSRP) and received signal received quality (RSRQ).

The determination may be made at the user equipment (UE) based on an indication from the base station (BS). The indication may further include receiving the indication via downlink signaling. Preferably, the downlink signaling is based on one or more radio resource control (RRC) messages. The channel measurements may be at least based on one of sounding reference signal (SRS) measurement and channel state information (CSI) report. The determining may be further based on a power headroom report (PHR), may be further based on at least one of uplink loading and signaling congestion, or both.

The channel measurements may comprise radio resource management (RRM) measurements. For that matter, the method may further include determining, by the user equipment (UE) in the radio resource control (RRC) inactive state, to transition to the RRC connected state for reception of multicast broadcast services (MBS) data based on channel measurements; transitioning to the RRC inactive state in response to the determining; and wherein the MBS data are received in the RRC inactive state. And the method may further include receiving, by the user equipment (UE) from the base station (BS): one or more first configuration parameters for determining one or more robustness metrics and one or more triggers; and determining to transition to the radio resource control (RRC) connected state based on the one or more robustness metrics and the one or more triggers. The one or more triggers may comprise one or more second thresholds and the determining to transition to the radio resource control (RRC) connected state may be based on comparing the one or more robustness metrics with the one or more second thresholds. The one or more second thresholds are smaller than one or more first thresholds used in determining of the transitioning from the RRC connected state to the RRC inactive state.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION OF THE INVENTION

Figure 1:
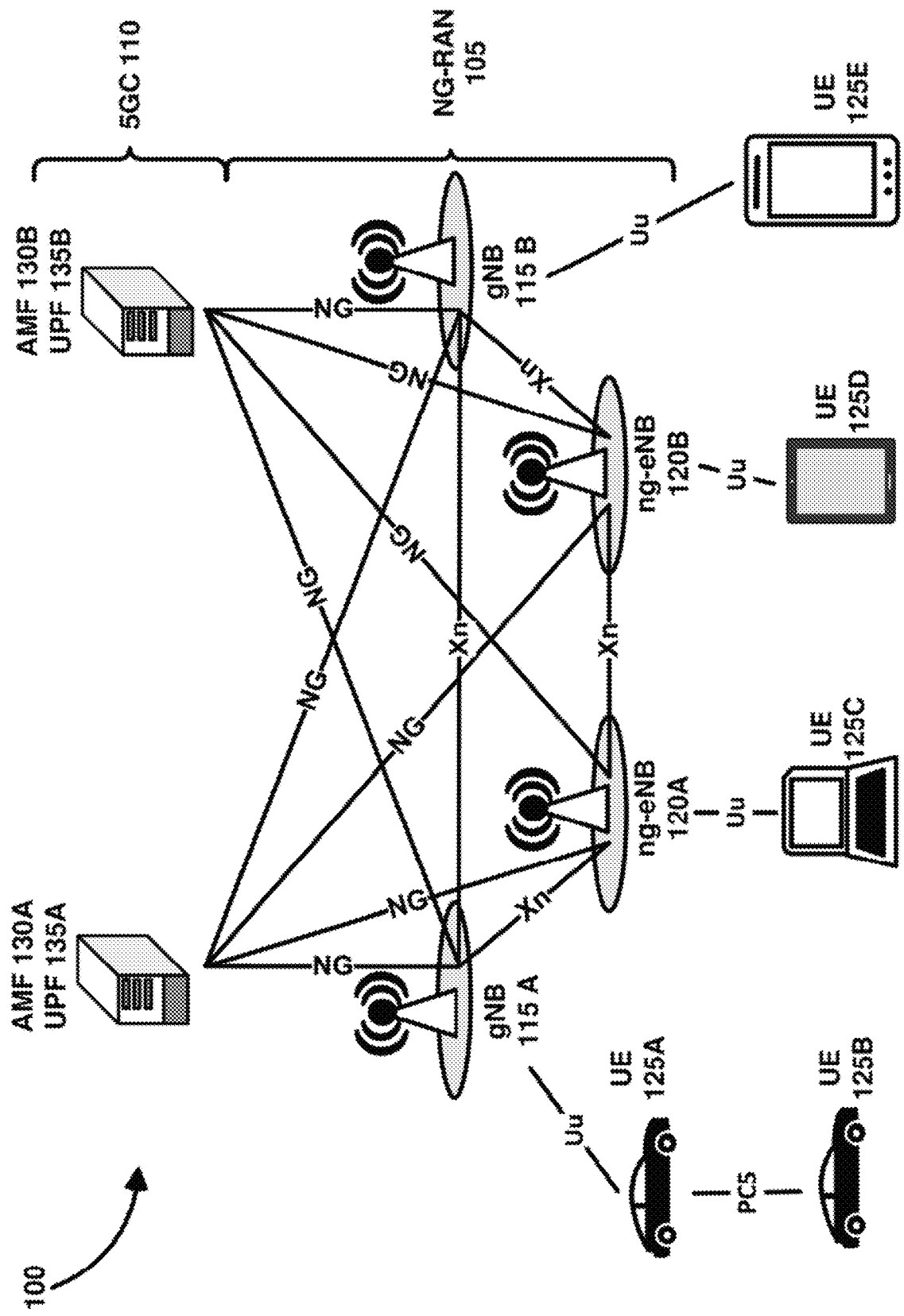
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
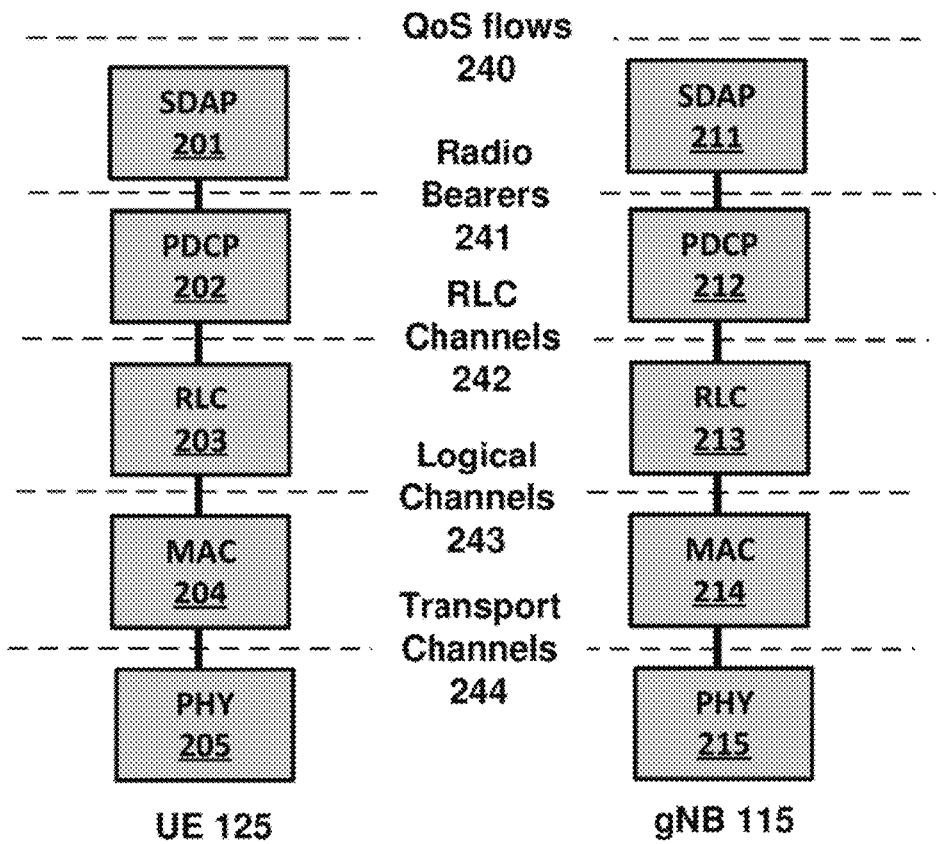
FIG. 2A and FIG. 2B show examples of radio protocol stacks for user plane and control plane, respectively, according to some aspects of some of various exemplary embodiments of the present disclosure.
Figure 2B:
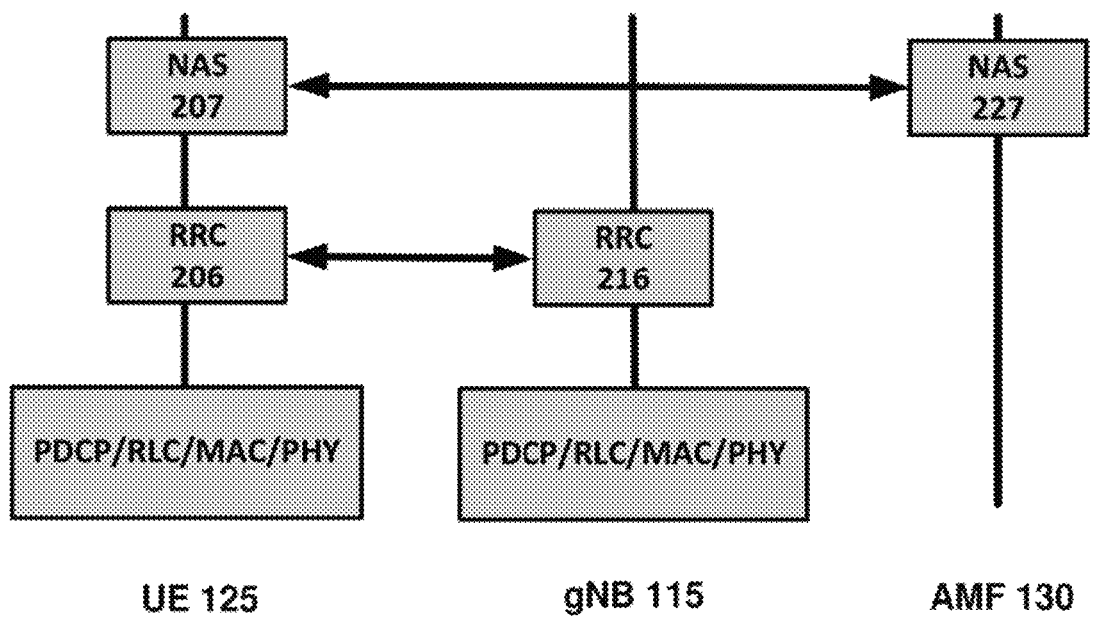

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
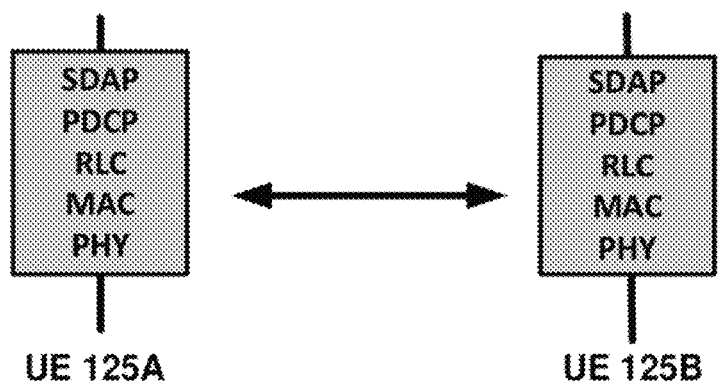
FIG. 5A, FIG. 5B, FIG. 5C and FIG. 5D show examples of radio protocol stacks for NR sidelink communication according to some aspects of some of various exemplary embodiments of the present disclosure.
Figure 5B:
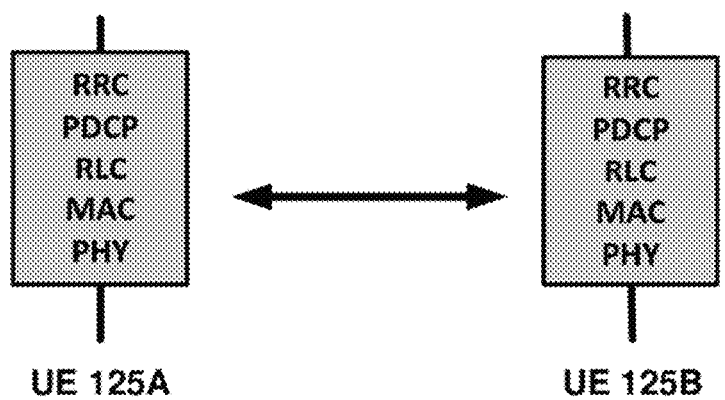
Figure 5C:
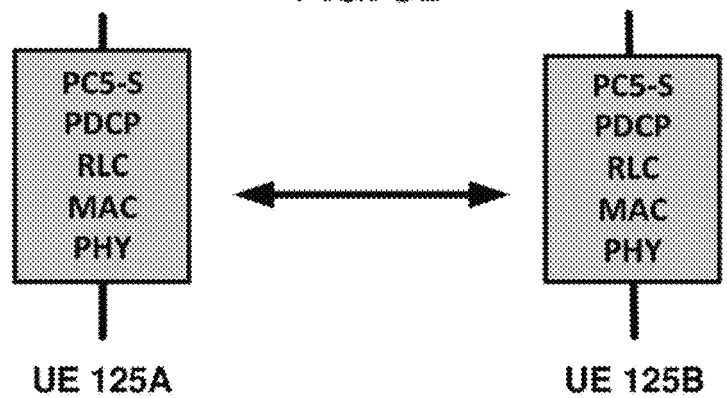
Figure 5D:
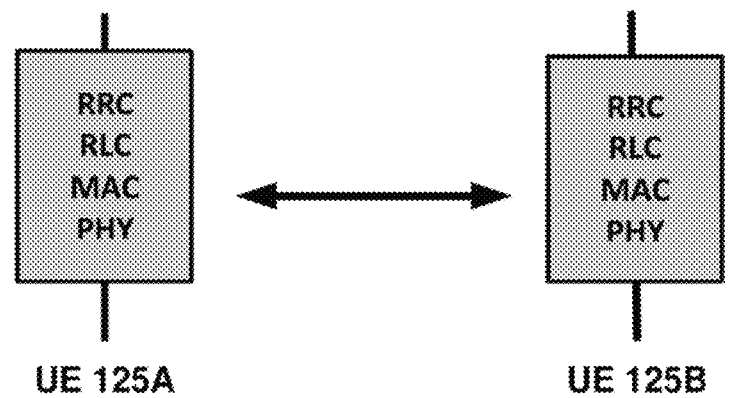

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
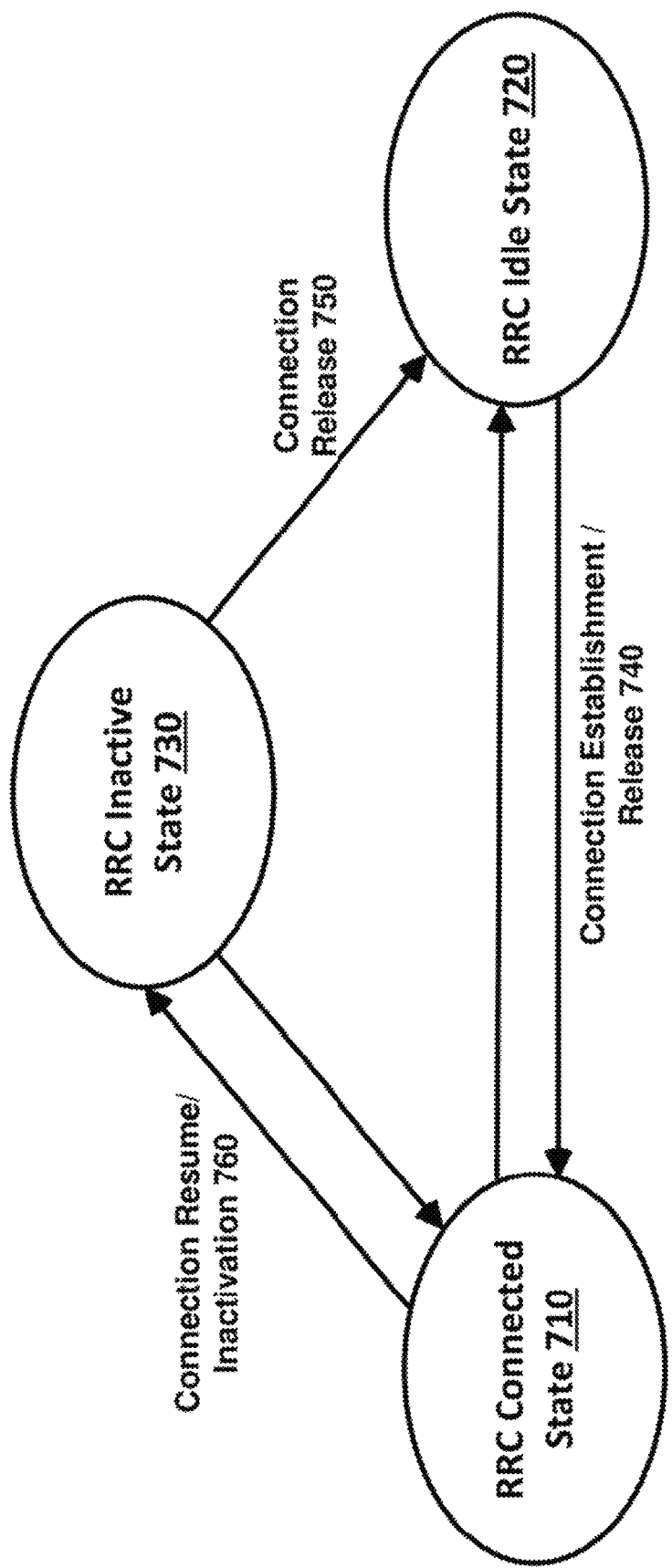
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
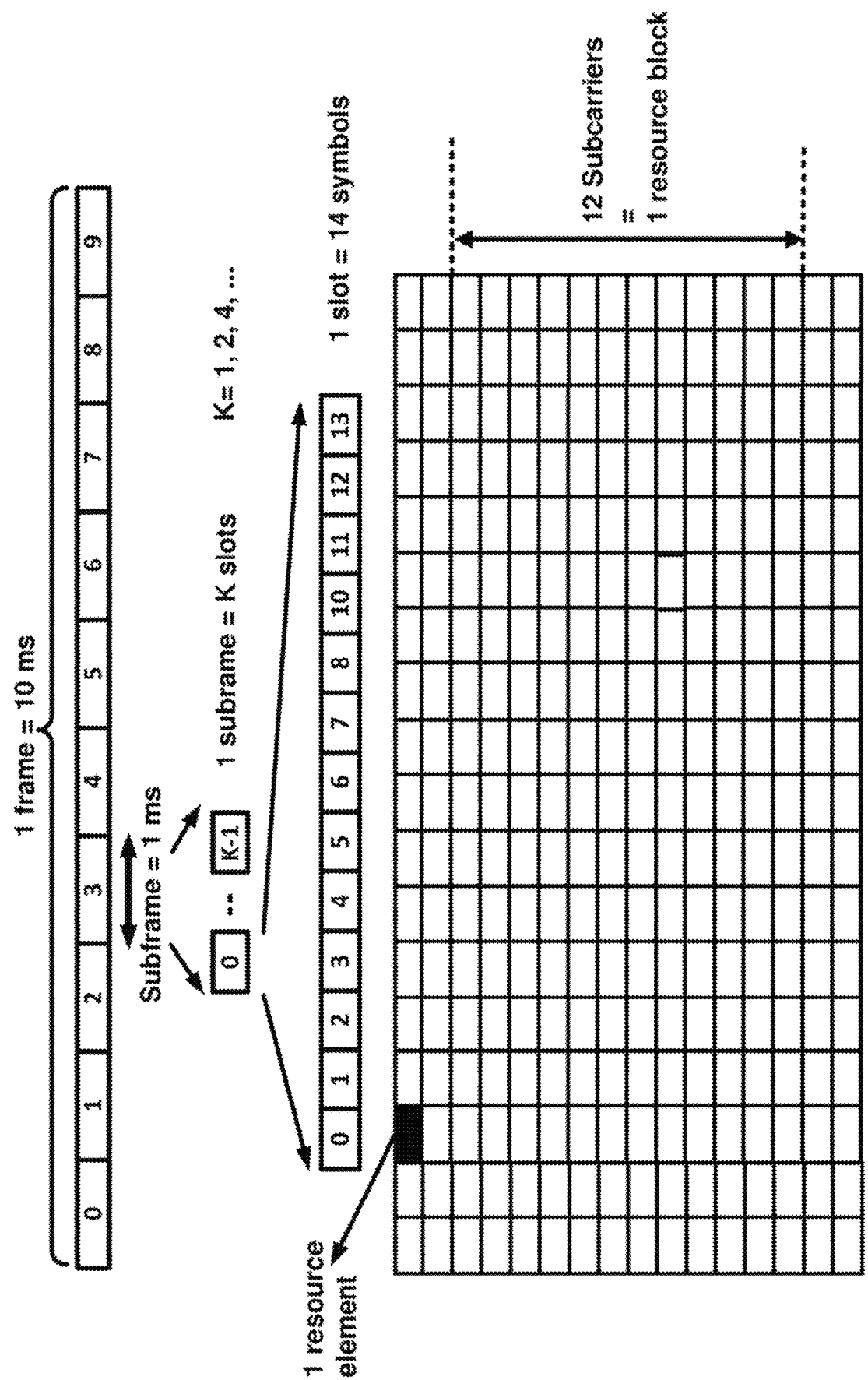
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
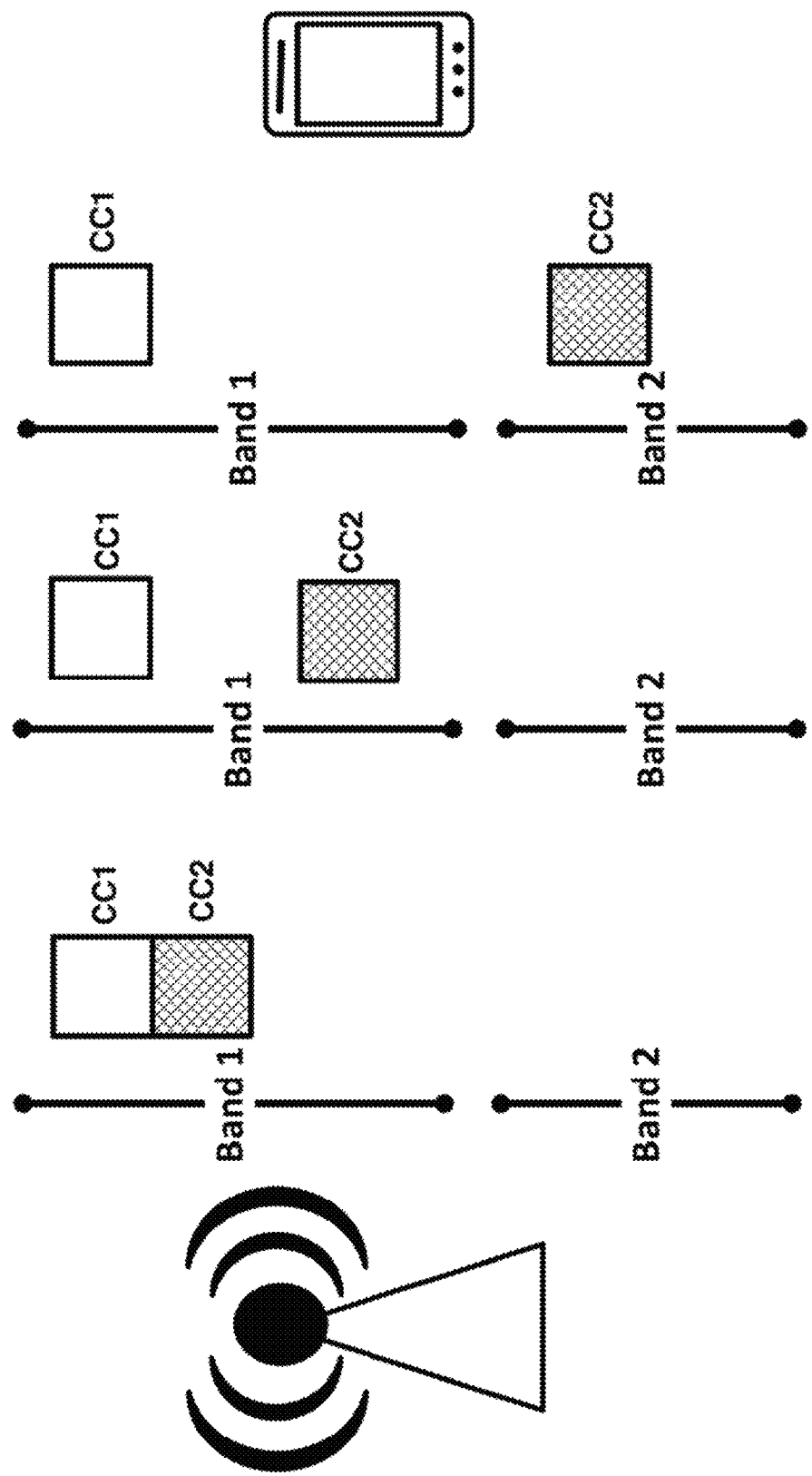
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
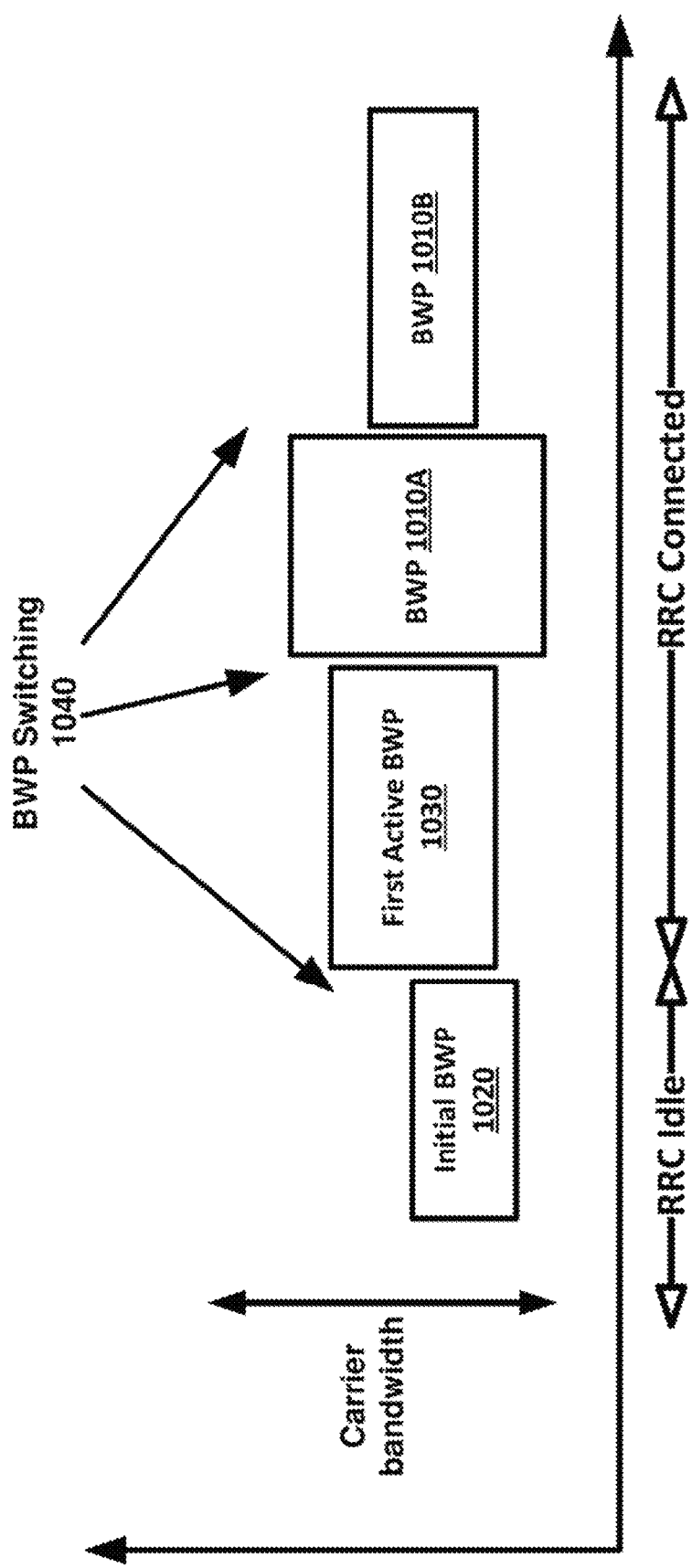
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
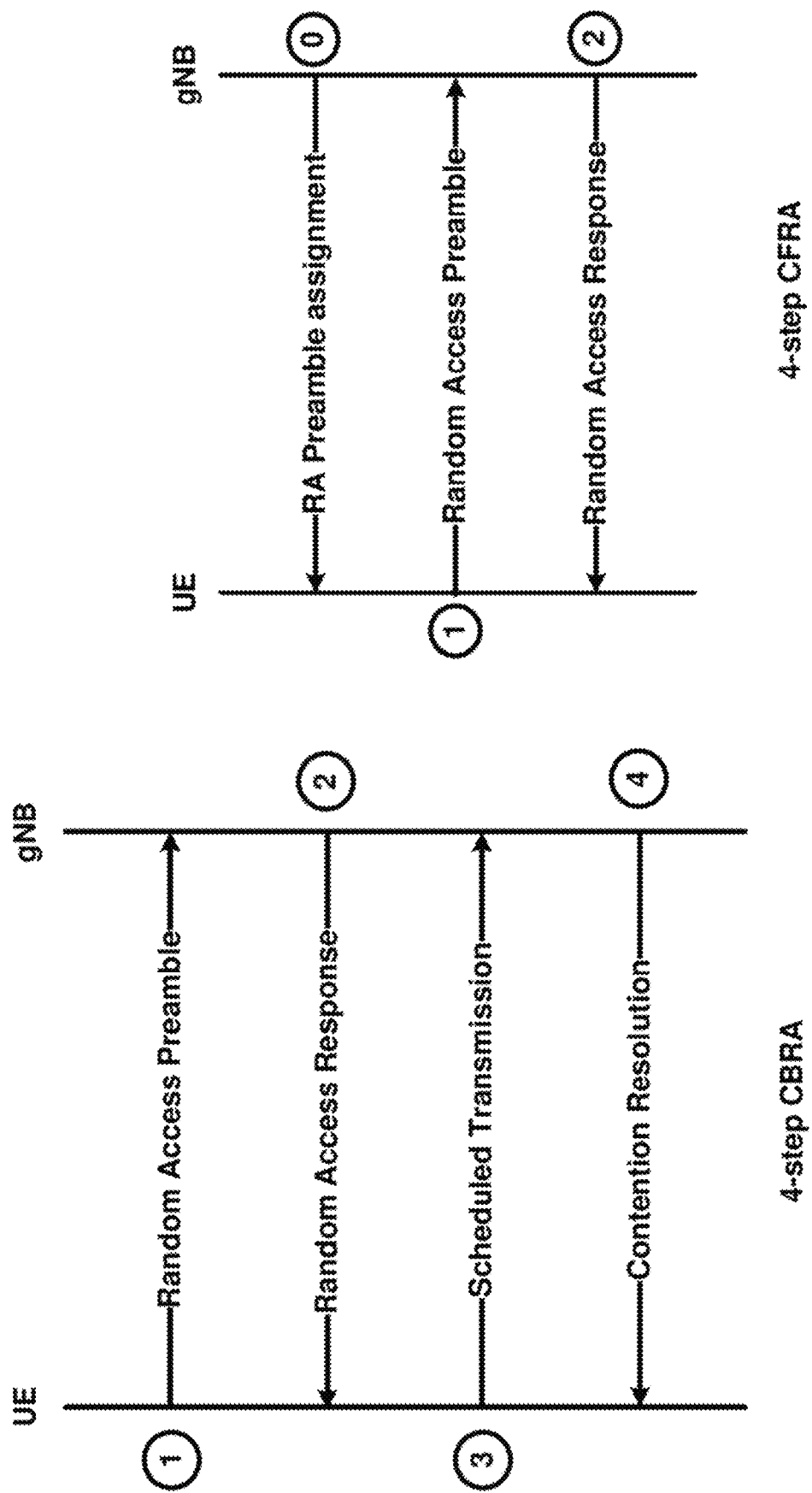
FIG. 11 shows example four-step contention-based and contention-free random access processes according to some aspects of some of various exemplary embodiments of the present disclosure.
Figure 12:
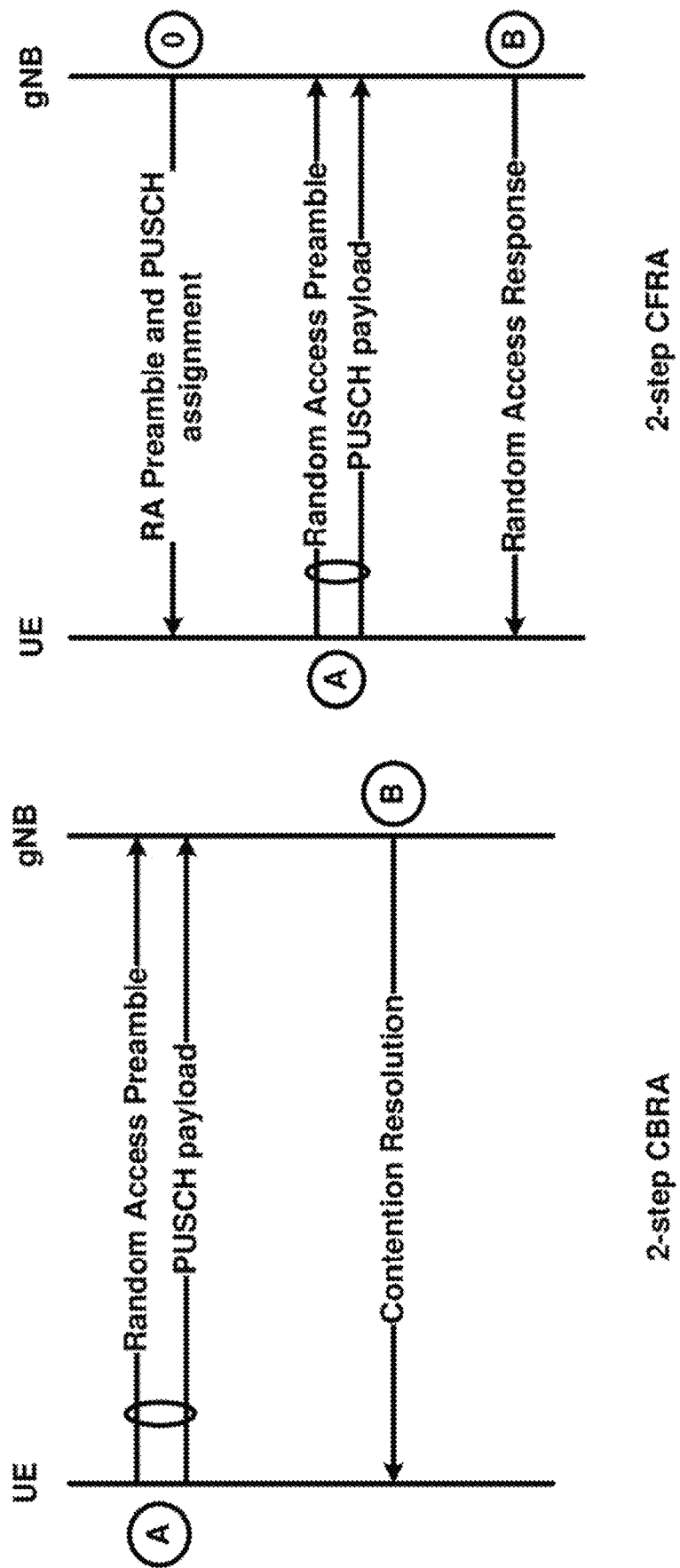
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
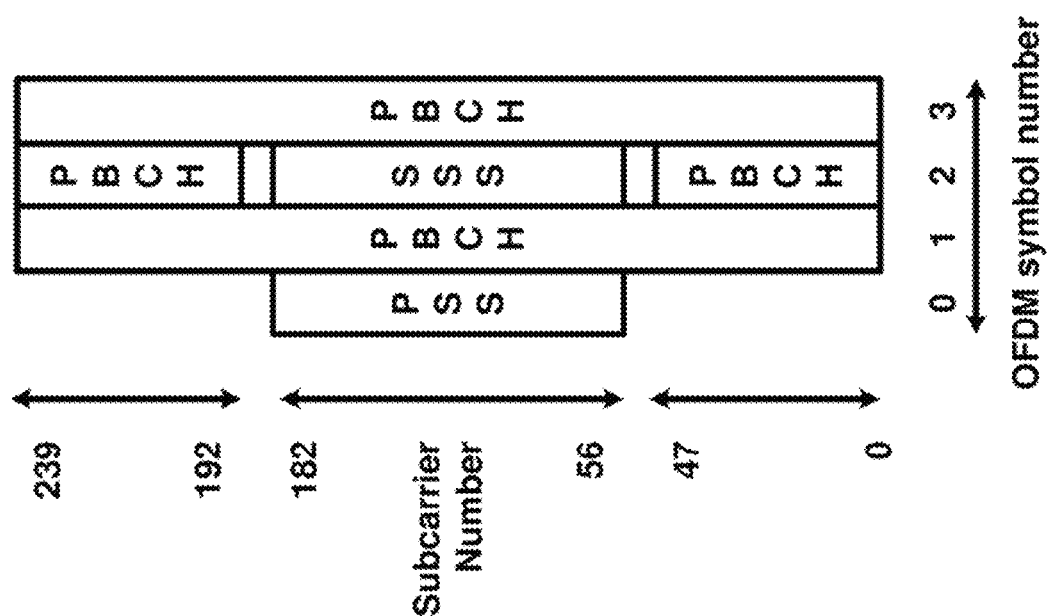
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
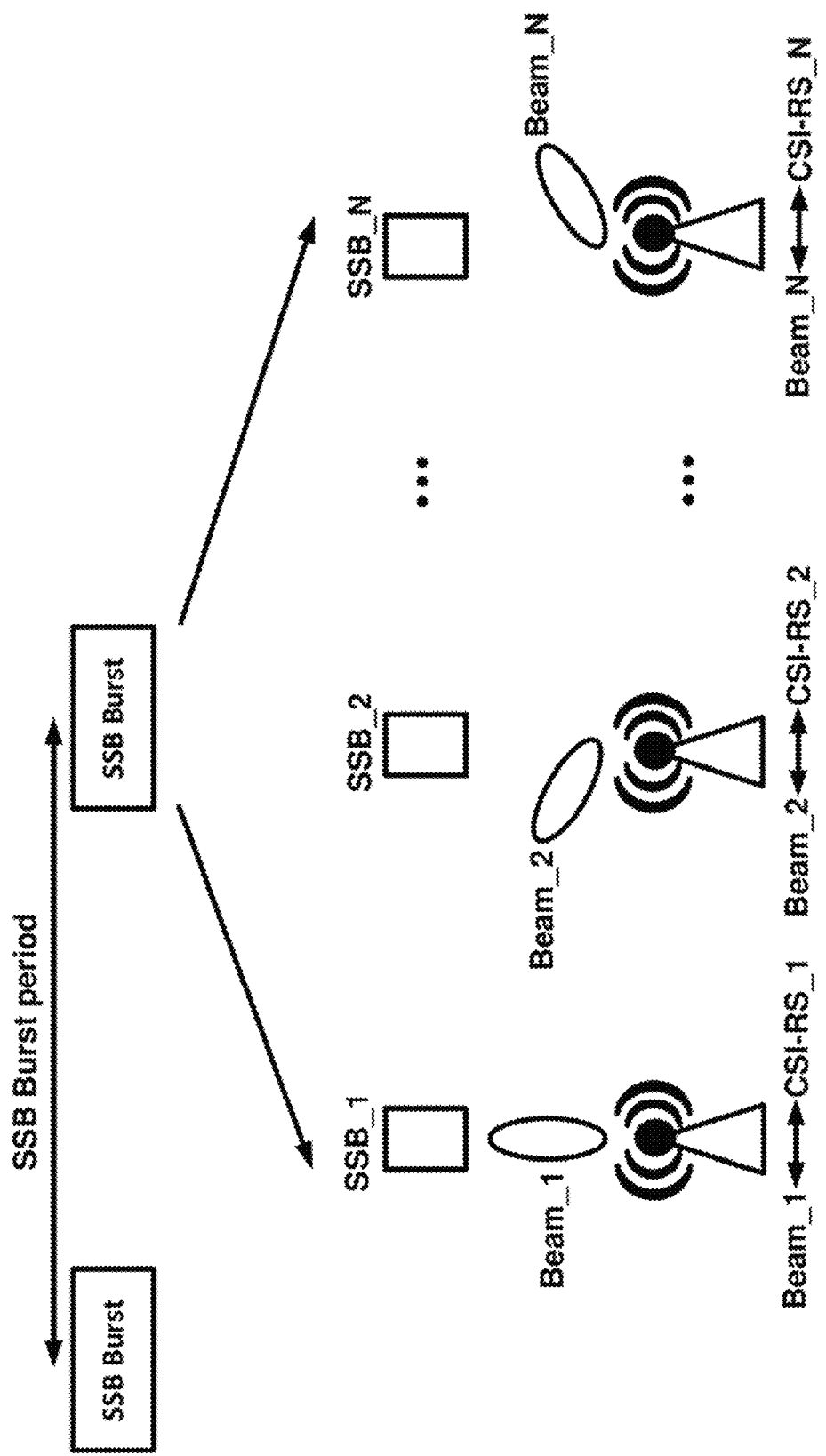
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
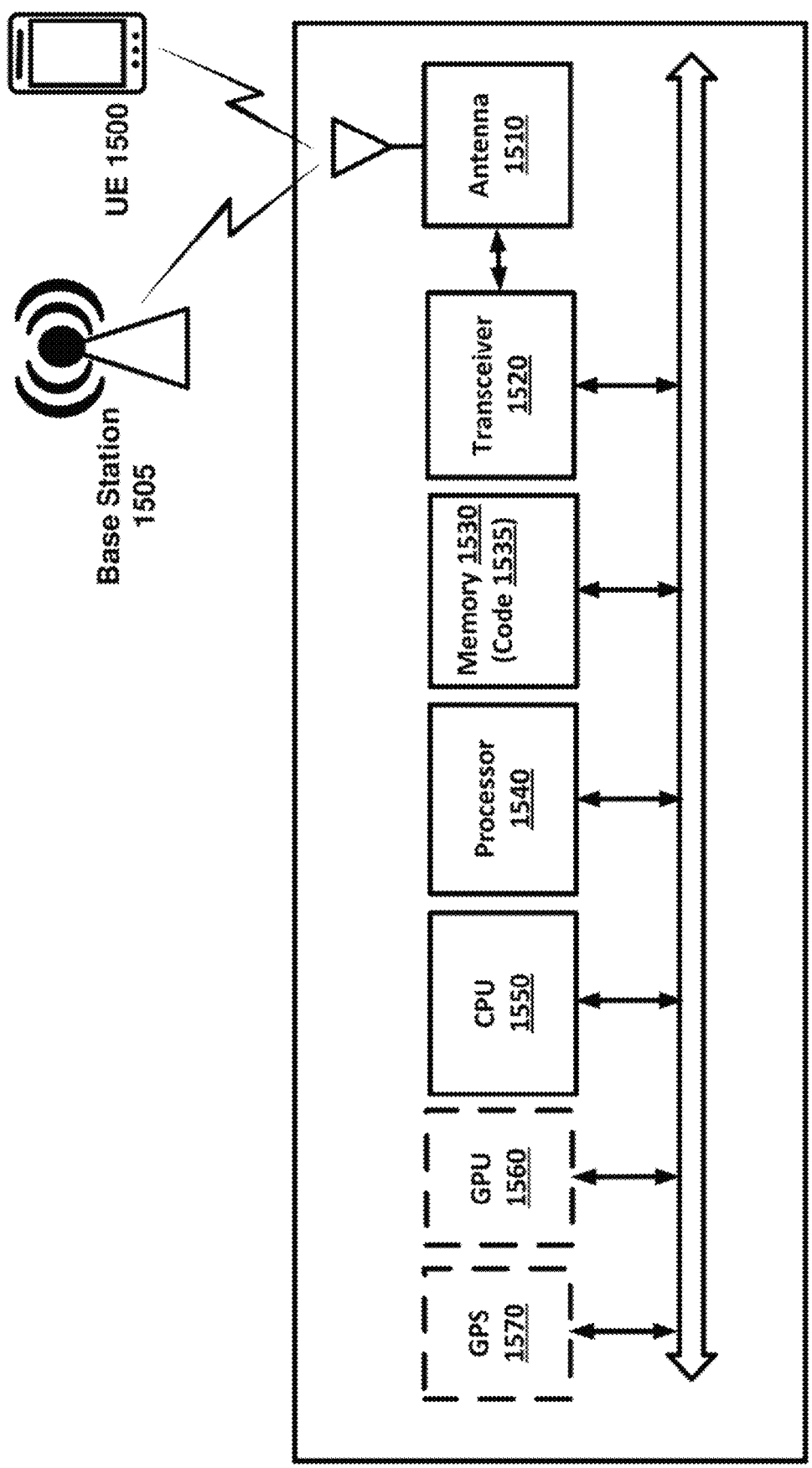
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. All or a subset of blocks and functions in FIG. 15 may be in the base station 1505 and the user equipment 1500 and may be performed by the user equipment 1500 and by the base station 1505. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In an example, for point-to-point (PTP) transmission in multicast broadcast services (MBS), for RRC_CONNECTED UEs, UE-specific PDCCH with CRC scrambled by UE-specific RNTI (e.g., C-RNTI) may be used to schedule UE-specific PDSCH which may be scrambled with the same UE-specific RNTI.

In an example, for point-to-multipoint (PTM) transmission in MBS (e.g., PTM transmission scheme 1), for RRC_CONNECTED UEs in the same MBS group, group-common PDCCH with CRC scrambled by group-common RNTI may be used to schedule group-common PDSCH which may be scrambled with the same group-common RNTI. This scheme may also be called a group-common PDCCH based group scheduling scheme.

In an example, for point-to-multipoint (PTM) transmission in MBS (e.g., PTM transmission scheme 2), for RRC_CONNECTED UEs in the same MBS group, UE-specific PDCCH with CRC scrambled by UE-specific RNTI (e.g., C-RNTI) may be used to schedule group-common PDSCH which may be scrambled with group-common RNTI. This scheme may also be called a UE-specific PDCCH based group scheduling scheme.

In an example, the UE-specific PDCCH/PDSCH may indicate the PDCCH/PDSCH may only be identified by the target UE but may not be identified by the other UEs in the same MBS group with the target UE.

In an example, the group-common PDCCH/PDSCH may indicate the PDCCH/PDSCH may be transmitted in the same time/frequency resources and may be identified by all the UEs in the same MBS group.

In an example, for RRC_CONNECTED UEs, if initial transmission for multicast is based on PTM transmission scheme 1, at least retransmission(s) can use PTM transmission scheme 1 may be used. In an example, PTP transmission for retransmission(s) may be used. In an example, PTM transmission scheme 2 for retransmission(s) may be used. In an example, association between PTM scheme 1 and PTP transmitting the same TB may be indicated. In an example, if multiple retransmission schemes are used, different retransmission schemes may be used simultaneously for different UEs in the same group.

In an example, for multicast of RRC-CONNECTED UEs, a common frequency resource for group-common PDCCH/PDSCH may be confined within the frequency resource of a dedicated unicast BWP to support simultaneous reception of unicast and multicast in the same slot.

In an example, the common frequency resource may be defined as an MBS specific BWP, which may be associated with the dedicated unicast BWP and using the same numerology (e.g., SCS and CP). In an example, BWP switching may be needed between the multicast reception in the MBS specific BWP and unicast reception in its associated dedicated BWP.

In an example, the common frequency resource may be defined as an MBS frequency region with a number of contiguous PRBs, which may be configured within the dedicated unicast BWP. In an example, the starting PRB and the length of PRBs of the MBS frequency region may be indicated.

In an example, a UE may be configured with no unicast reception in the common frequency resource.

In an example, more than one common frequency resources per UE/per dedicated unicast BWP may be subject to UE capabilities.

In an example, one unicast PDSCH and one group-common PDSCH may be TDM multiplexed in a slot based on UE capability for RRC_CONNECTED UEs.

In an example, SPS group-common PDSCH may be used for MBS for RRC_CONNECTED UEs.

In an example, group-common PDCCH may be used or UE-specific PDCCH for SPS group-common PDSCH activation/deactivation.

In an example, more than one SPS group-common PDSCH configuration per UE may be used.

In an example, for PTM transmission scheme 1, the CORESET for group-common PDCCH may be configured within the common frequency resource for group-common PDSCH. In an example, a number of CORESET(s) for group-common PDCCH within the common frequency resource for group-common PDSCH may be configurable.

In an example, for search space set of group-common PDCCH of PTM scheme 1 for multicast in RRC_CONNECTED state, the CCE indexes may be common for different UEs in the same MBS group.

In an example, for RRC_CONNECTED UEs, unicast PDSCH and group-common PDSCH may be inter-slot TDM'ed in different slots.

In an example, the following cases for simultaneous reception of unicast PDSCH and group-common PDSCH in a slot based on UE capability for RRC_CONNECTED UEs. In an example, TDM between multiple TDMed unicast PDSCHs and one group-common PDSCH may be used in a slot. In an example, TDM among multiple group-common PDSCHs in a slot may be used. In an example, TDM between multiple TDMed unicast PDSCHs and multiple TDMed group-common PDSCHs in a slot may be used. In an example, FDM between multiple TDMed unicast PDSCHs and multiple TDMed group-common PDSCHs in a slot may be used. In an example, FDM among multiple group-common PDSCHs in a slot may be used.

In an example, for search space set of group-common PDCCH of PTM scheme 1 for multicast in RRC_CONNECTED state: a new search space type specific for multicast may be defined.

In an example, for RRC_CONNECTED UEs receiving multicast, at least for PTM scheme 1, at least one of ACK/NACK based HARQ-ACK feedback for multicast and NACK-only based HARQ-ACK feedback for multicast may be used.

In an example, for ACK/NACK based HARQ-ACK feedback for multicast, from per UE perspective, UE may feedback ACK or NACK. From UEs within the group perspective, PUCCH resource configuration for ACK/NACK feedback may be shared or separate PUCCH resources.

In an example, for NACK-only based HARQ-ACK feedback for multicast, from per UE perspective, UE may only feedback NACK. From UEs within the group perspective, PUCCH resource configuration may be for NACK only feedback.

In an example, ACK/NACK-based or NACK-only based HARQ-ACK feedback may be configurable.

In an example, for RRC_CONNECTED UEs receiving multicast, for ACK/NACK based HARQ-ACK feedback if used for group-common PDCCH scheduling, PUCCH resource configuration for HARQ-ACK feedback from per UE perspective may be shared with PUCCH resource configuration for HARQ-ACK feedback for unicast or may be separate from PUCCH resource configuration for HARQ-ACK feedback for unicast.

In an example, for RRC_CONNECTED UEs receiving multicast, for NACK-only based HARQ-ACK feedback if used for group-common PDCCH scheduling, PUCCH resource configuration for HARQ-ACK feedback from per UE perspective may be separate from PUCCH resource configuration for HARQ-ACK feedback for unicast.

In an example, enabling/disabling HARQ-ACK feedback for MBS may be used, e.g., via DCI, or RRC configuration enabling/disabling, or RRC may configure the enabling/disabling function and DCI may indicate enabling/disabling, or MAC CE may indicate enabling/disabling, or RRC may configure the enabling/disabling function and MAC CE may indicate enabling/disabling.

In an example, for slot-level repetition for group-common PDSCH of RRC_CONNECTED UEs, for indicating the repetition number, DCI may be used, or RRC may be used, or RRC and DCI may be used, or MAC CE may be used, or RRC and MAC CE may be used.

In an example, from the perspective of RRC_CONNECTED UEs receiving multicast, at least for PTM scheme 1 initial transmission, retransmission may be based on a group-common PDCCH scheduled group-common PDSCH, a UE-specific PDCCH scheduled PDSCH (e.g., UE-specific PDSCH or group-common PDSCH). In an example, retransmission may be based on code block group (CBG).

In an example, for ACK/NACK based HARQ-ACK feedback if used, both Type-1 and Type-2 HARQ-ACK codebook may be used for RRC_CONNECTED UEs receiving multicast.

In an example, for RRC_IDLE/RRC_INACTIVE UEs, support group-common PDCCH with CRC scrambled by a common RNTI to schedule a group-common PDSCH, where the scrambling of the group-common PDSCH may be based on the same common RNTI.

In an example, for RRC_IDLE/RRC_INACTIVE UEs, beam sweeping may be used for group-common PDCCH/PDSCH.

In an example, for RRC_IDLE/RRC_INACTIVE UEs, common frequency resource(s) for group-common PDCCH/PDSCH may be defined/configured.

In an example, the UE may assume the initial BWP as the default common frequency resource for group-common PDCCH/PDSCH, if a specific common frequency resource is not configured.

In an example, from physical layer perspective, for broadcast reception, the same group-common PDCCH and the corresponding scheduled group-common PDSCH may be received by both RRC_IDLE/RRC_INACTIVE UEs and RRC_CONNECTED UEs.

In an example, for RRC_IDLE/RRC_INACTIVE UEs, common search space (CSS) may be used for group-common PDCCH.

In an example, for RRC_IDLE/RRC_INACTIVE UEs, a CORESET may be configured within the common frequency resource for group-common PDCCH/PDSCH.

In an example, for RRC_CONNECTED UEs, if ACK/NACK based HARQ-ACK feedback is used for PTM scheme 1, and if initial transmission for multicast is based on PTM transmission scheme 1, retransmission(s) may use PTP transmission. In an example, the HARQ process ID and NDI indicated in DCI may be used to associate the PTM scheme 1 and PTP transmitting the same TB.

In an example, for RRC_CONNECTED UEs, more than one SPS group-common PDSCH configuration for MBS may be configured per UE subject to UE capability.

In an example, for RRC_CONNECTED UEs, HARQ-ACK feedback for SPS group-common PDSCH for MBS may be used.

In an example, the CFR (common frequency resource) for multicast of RRC-CONNECTED UEs, which may be confined within the frequency resource of a dedicated unicast BWP and using the same numerology (SCS and CP), may include the following configurations: starting PRB and the number of PRBs, one PDSCH-config for MBS (e.g., separate from the PDSCH-Config of the dedicated unicast BWP), one PDCCH-config for MBS (e.g., separate from the PDCCH-Config of the dedicated unicast BWP), SPS-config(s) for MBS (e.g., separate from the SPS-Config of the dedicated unicast BWP).

In an example, for search space set of group-common PDCCH of PTM scheme 1 for multicast in RRC_CONNECTED state, at least CSS may be used.

In an example, for activation/deactivation of SPS group-common PDSCH for MBS in RRC_CONNECTED state, at least group-common PDCCH may be used.

In an example, for ACK/NACK based feedback if used for RRC_CONNECTED UEs receiving multicast, UE may be optionally configured a separate PUCCH-Config for multicast. Otherwise, PUCCH-Config for unicast may apply.

In an example, the priority for HARQ-ACK feedback for RRC_CONNECTED UE receiving multicast may be, lower, higher than or equal to the HARQ-ACK feedback for unicast.

In an example, for RRC_CONNECTED UEs receiving multicast, ACK/NACK based HARQ-ACK feedback for multicast may be used and NACK-only based HARQ-ACK feedback for multicast may be used.

In an example, for the cases of HARQ-ACK feedback (at least for ACK/NACK based feedback) is available for multicast and unicast for a given UE receiving multicast, for determining the PUCCH resource, multiplexing for the same priority and prioritizing for different priorities at least when the corresponding PUCCH resources overlap in time in a slot may be used.

In an example, for ACK/NACK based feedback if used for multicast, construction of Type-1 HARQ-ACK codebook based on the union of the PDSCH TDRA sets of the unicast service and the multicast service (if they are separately configured), at least of the same priority, may be used.

In an example, slot-level repetition for group-common PDSCH for RRC_CONNECTED UEs receiving multicast may be used.

In an example, for enabling/disabling HARQ-ACK feedback for RRC_CONNECTED UE receiving multicast, RRC signaling may configure the enabling/disabling function of DCI indicating the enabling/disabling HARQ-ACK feedback. In an example, DCI may indicate (explicitly or implicitly) whether HARQ-ACK feedback is enabled/disabled. In an example, enabling/disabling may be by MAC CE.

In an example, for RRC_IDLE/RRC_INACTIVE UEs, one common frequency resource for group-common PDCCH/PDSCH may be defined/configured.

In an example, for RRC_IDLE/RRC_INACTIVE UEs, for broadcast reception, the UE may assume that group-common PDCCH/PDSCH is QCL'd with SSB.

In an example, for broadcast reception, the same group-common PDCCH and the corresponding scheduled group-common PDSCH may be received by both RRC_IDLE/RRC_INACTIVE UEs and RRC_CONNECTED UEs when UE-specific active BWP of RRC_CONNECTED UE contains the common frequency resource of RRC_IDLE/INACTIVE UEs and the SCS and CP are the same.

In an example, two modes may be available for MBS, one delivery mode for high QoS (reliability, latency) requirement, to be available in RRC CONNECTED state and one delivery mode for "low" QoS requirement may be available where the UE may also receive data in INACTIVE/IDLE state. In an example, delivery mode 1 may be used only for multicast sessions. In an example, delivery mode 2 may be used for broadcast sessions. In an example, mode 2 may be available for multicast sessions. In an example, when there is no data ongoing for the multicast session, the UE may stay in RRC_CONNECTED. In general, information of MBS services/groups subscribed by the UE (e.g., TMGI) and QOS requirements of an MBS service may be provided to RAN.

In an example, the function of mapping from QoS flows to MBS RBs in SDAP may be needed for NR MBS.

In an example, both idle/inactive UEs and connected mode UEs may receive MBS services transmitted by NR MBS delivery mode 2 (e.g., broadcast service). The ability for connected mode UEs to receive this may depend on the network provisioning of the service (e.g., which frequency), UE connected mode configuration and UE capabilities.

In an example, a two-step approach (e.g., BCCH and MCCH) may be used for the transmission of PTM configuration for NR MBS delivery mode 2. In an example, MCCH change notification mechanism may be used to notify the changes of MCCH configuration due to session start for delivery mode 2 of NR MBS. Ina n example, MBS Interest Indication may be used for UEs in connected mode for Broadcast service. In an example, MBS Interest Indication may NOT be used for UEs in idle/inactive mode for NR MBS delivery mode 2.

In an example, a Power Headroom reporting procedure may be used to provide the serving gNB with the following information: Type 1 power headroom (the difference between the nominal UE maximum transmit power and the estimated power for UL-SCH transmission per activated Serving Cell); Type 2 power headroom (the difference between the nominal UE maximum transmit power and the estimated power for UL-SCH and PUCCH transmission on SpCell of the other MAC entity); Type 3 power headroom (the difference between the nominal UE maximum transmit power and the estimated power for SRS transmission per activated Serving Cell); and MPE P-MPR (the power back-off to meet the MPE FR2 requirements for a Serving Cell operating on FR2).

In an example, an IE PUCCH-Config may be used to configure UE specific PUCCH parameters (e.g., per BWP). In an example, the IE PUCCH-ConfigCommon may be used to configure the cell specific PUCCH parameters. In an example, the IE PUCCH-ConfigurationList may be used to configure UE specific PUCCH parameters (e.g., per BWP) for two simultaneously constructed HARQ-ACK codebooks.

The 5G MBS data sessions may have a wide range of durations and transmission periodicities. Many UEs may also be receiving MBS data without much unicast traffic and signaling during the MBS sessions. It may be important to optimize power saving for UEs with MBS sessions as the UE may be able to receive 5G MBS in all RRC states. Example embodiments enhance the power saving for MBS data reception by optimizing uplink feedback periodicities and/or resuming/stopping of uplink feedback and/or RRC transitioning to impact the amount of uplink feedback.

In some examples, the UEs in RRC connected state may monitor PDCCH in DL and send PUCCH in UL for unicast services. In this case there may be no MBMS uplink feedback transmission from UE.

In some examples, the data scheduling may use a SPS approach or a DRX approach. The UEs may monitor PDCCH periodically to receive for MBS notifications and data. In some examples, for reliable delivery of 5G MBS services, at least for multicast mode the UEs receiving service may provide feedback to the RAN to ensure quality and reliable of their MBS service.

In some examples, while MBS feedbacks from UEs may be needed, the amount of such feedbacks may be limited to avoid extra signaling overhead in UL as well as extra power consumption by UEs. The MBS transmission parameters and retransmission decisions may be made to accommodate MBS users with weaker channel condition. In some examples, the uplink feedback from MBS users with higher signal quality, or robust channel condition, may be inconsequential to MBS transmission decisions by the RAN. Meanwhile, such feedback transmissions may impact UE power consumption and battery life. In some examples, uplink feedback on MBS from UEs with robust channel condition may be inconsequential to RAN's MBS Transmissions.

In some examples, the MBS feedback reduction may be binary or gradual. In some examples, uplink feedback from UEs with very robust channel conditions for MBS reception may be avoided. In some examples, the periodicity of MBS feedback in UL from UEs may be increased based on channel robustness metric.

In some examples, the RAN may apply triggering conditions for UEs to reduce or stop their uplink feedback transmissions when not needed for MBS transmission decisions. Such triggers may be checked and applied by the RAN, and the direction for feedback reduction can be signaled to UE using RRC signaling. In this case MBS robustness metric may be determined by RAN based on uplink path loss estimations using UE's SRS, CSI feedback or PHR reporting and may also consider uplink loading and signaling congestion.

In some examples, the RAN may evaluate the channel robustness for MBS delivery for a UE based on uplink measurements, e.g., on SRS, or UEs CSI feedback or RRM measurement reports in the uplink.

Figure 16:
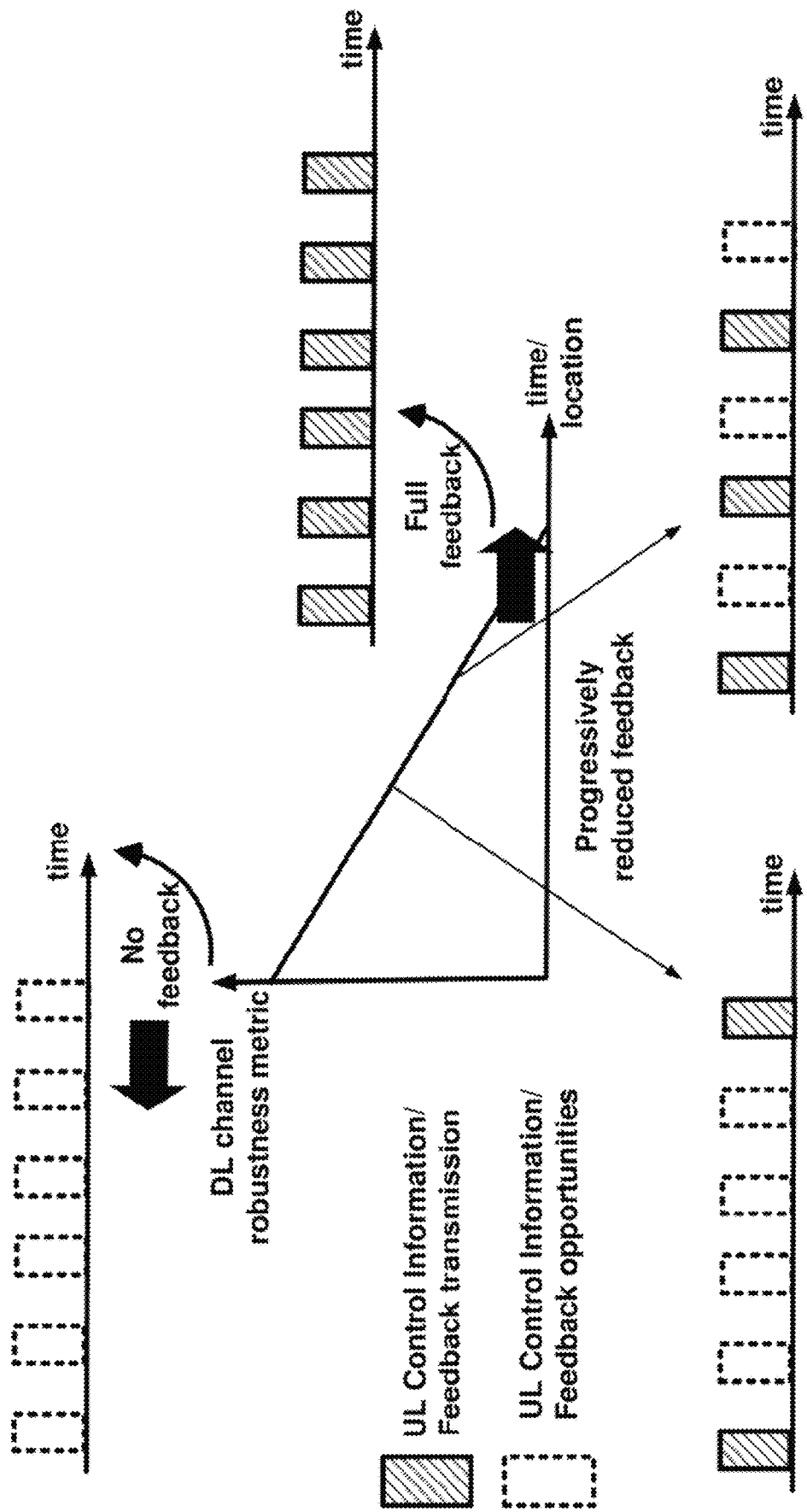
FIG. 16 shows an example process according to some aspects of some of various exemplary embodiments of the present disclosure.

In some examples as shown in FIG. 16, the UEs may be configured with multiple PUCCH Resource Set. A condition to select a set or configuration may be the channel robustness. In some examples, the RAN may configure different PUCCH resources set with different periodicity to be used by UEs based on channel robustness conditions. In some examples, the same PUCCH configuration may be used and based on channel robustness, the UEs may use every other Nth resource, where N may increase with channel robustness. In some examples, the RAN may evaluate the need for uplink MBS feedback from UEs and may change their feedback configurations, e.g. PUCCH resource set configuration, to reduce or stop such feedbacks.

In some examples, dedicated signaling may be used from the RAN to each UE which qualifies for reduced feedback.

In some examples, the RAN may configure triggering conditions to be monitored by the UE and once reached the UE may reduce its feedback frequency or may stop them. The channel robustness metric may be determined by the UE based on channel quality conditions, e.g., minimum sustained layer 3 (L3) received signal received power (RSRP) or received signal received quality (RSRQ) level, UE's expected battery life and/or other factors as configured by the RAN. In some examples, the RAN may configure triggering conditions for MBS feedback reduction to be monitored by the UE and once reached the UE may reduce its feedback frequency or stop them.

In some examples, the UE may reduce its uplink feedback by switching to PUCCH resource set/configuration with longer period or stop its transmission. In some examples, the change may be made by UE with notifying the base station as preconfigured by the RAN for the MBS service. In some examples, the change may be made by UE without notifying the base station as preconfigured by the RAN for the MBS service. In some examples, the UE may indicate the feedback reduction or its stopping to RAN through uplink control signaling before it applies the change.

In some examples, the UE may reduce its uplink feedback without explicit additional signaling and confirmation with the RAN. This option may be used more efficiently when common PUCCH resources are configured to be shared, e.g., through CDM or TDM, by MBS users for their uplink feedback.

In some examples, multicast data may be received in RRC connected, idle or inactive state. For multicast data reception in inactive and idle state, the UE may provide HARQ and CSI Feedback and Monitor PDCCH for MBS data reception on BWP associated with MBS which may cause overhead in the uplink and impact UE power saving. Some companies have suggested support for multicast reception should be limited to RRC connected state UEs. In some examples, keeping MBS users in RRC connected state may also result in radio resource limitations in the RAN during period of high congestion.

In some examples, to address both UE power saving and network resource preservation the MBS UEs with robust channel conditions may be moved to inactive state or idle state. The benefits of keeping UEs in the inactive state over idle state is that the RAN may maintain UE's context in inactive state and such transition while may help RAN during congestion may maintain base stations control of MBS service continuity and reliability.

Figure 17:
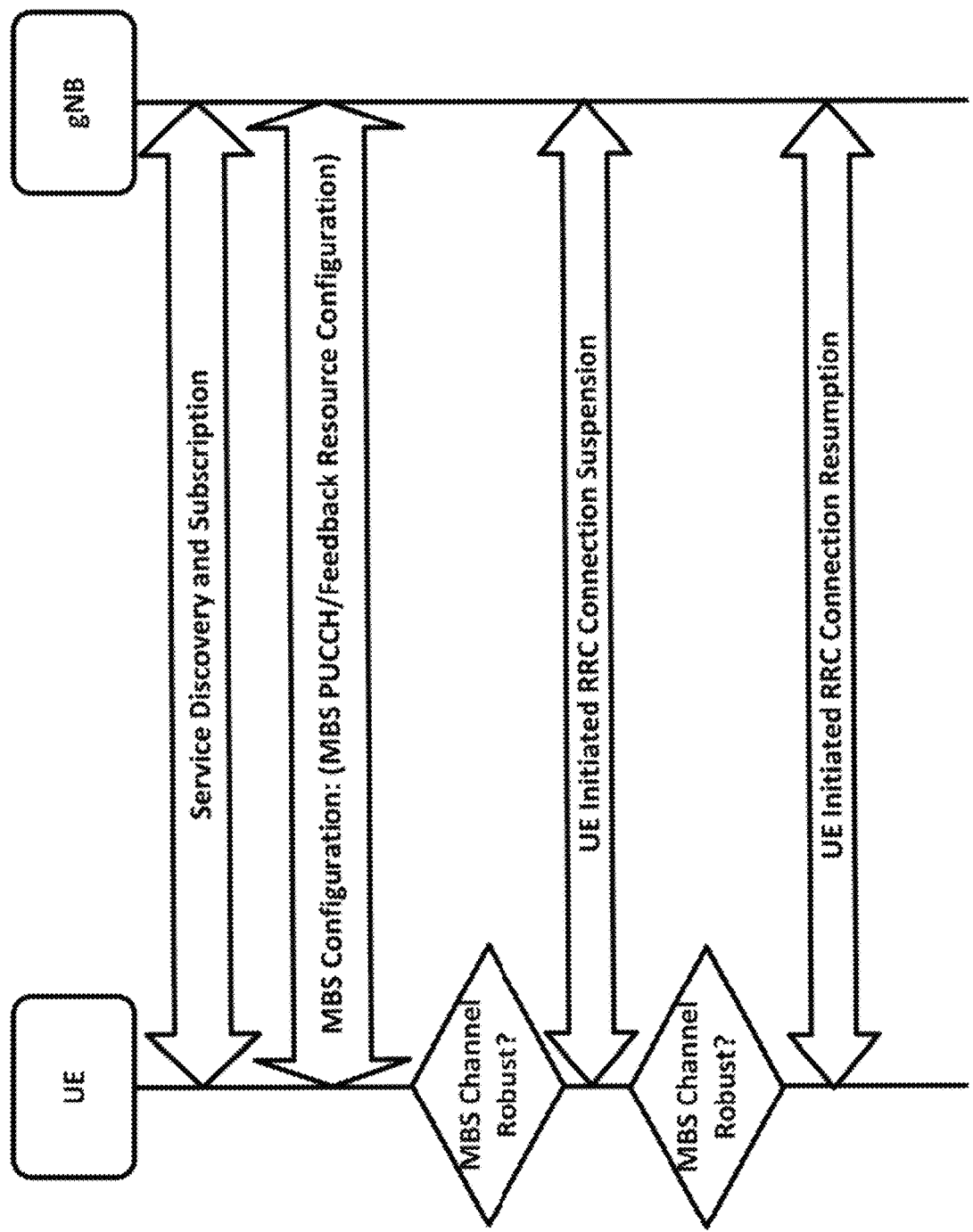
FIG. 17 shows an example process according to some aspects of some of various exemplary embodiments of the present disclosure.
Figure 18:
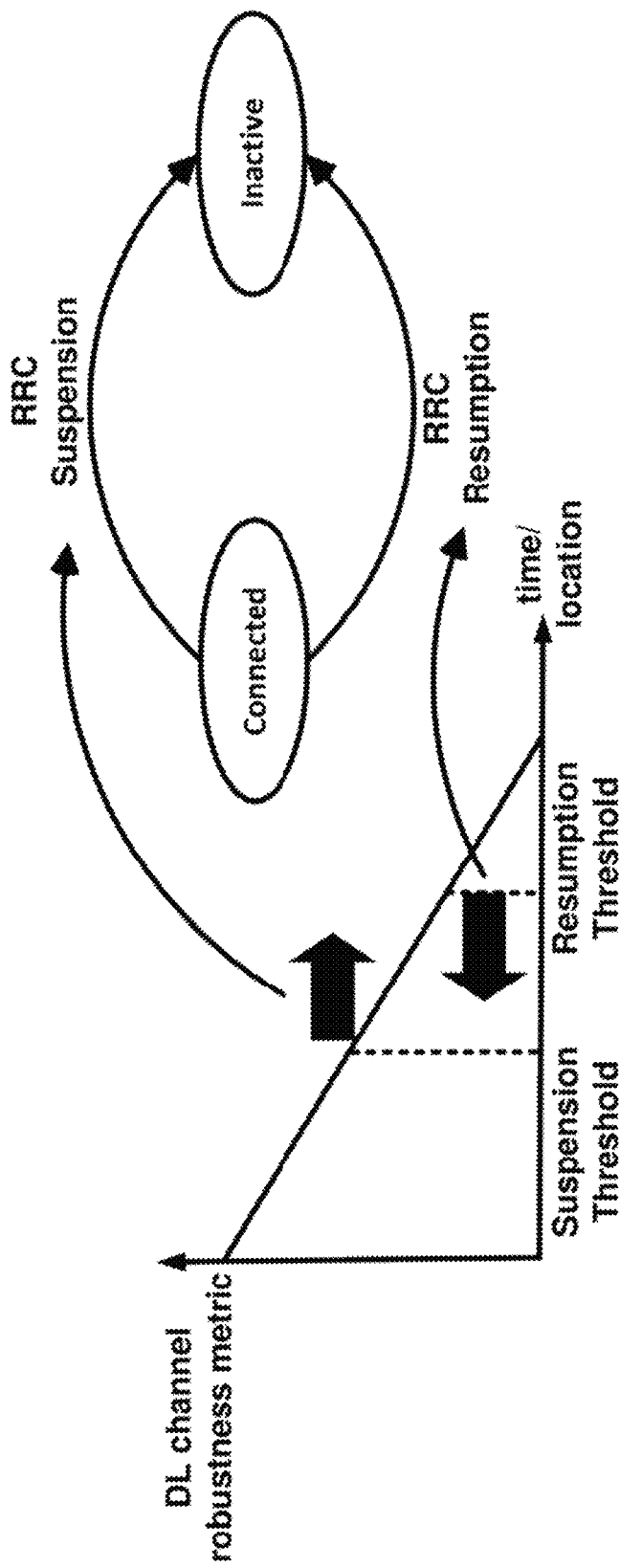
FIG. 18 shows an example process according to some aspects of some of various exemplary embodiments of the present disclosure.

In some examples, the RAN may configure UE with MBS robustness metrics and feedback triggers and once the trigger is reached the UE may move to inactive state unless its need to stay connected for other services. In some examples, transition of UEs to inactive state may be triggered by UE when channel robustness quality is reached or by the network based on similar or different measures, such as network congestion. In some examples, the triggering thresholds may be such that moving back and forth between connected and inactive state is avoided. Example embodiments are shown in FIG. 17 and FIG. 18.

In some examples, when UE based trigger is used, the threshold for suspension may be set at higher value than threshold for resumption to avoid unnecessary back and forth state transitions. Given the variety of MBS services, the number and mobility of users receiving the service, the traffic pattern, etc. the RAN may take a different approach for power saving and feedback reduction. The RAN may configure different feedback reduction approach for different MBS services.

Figure 19:
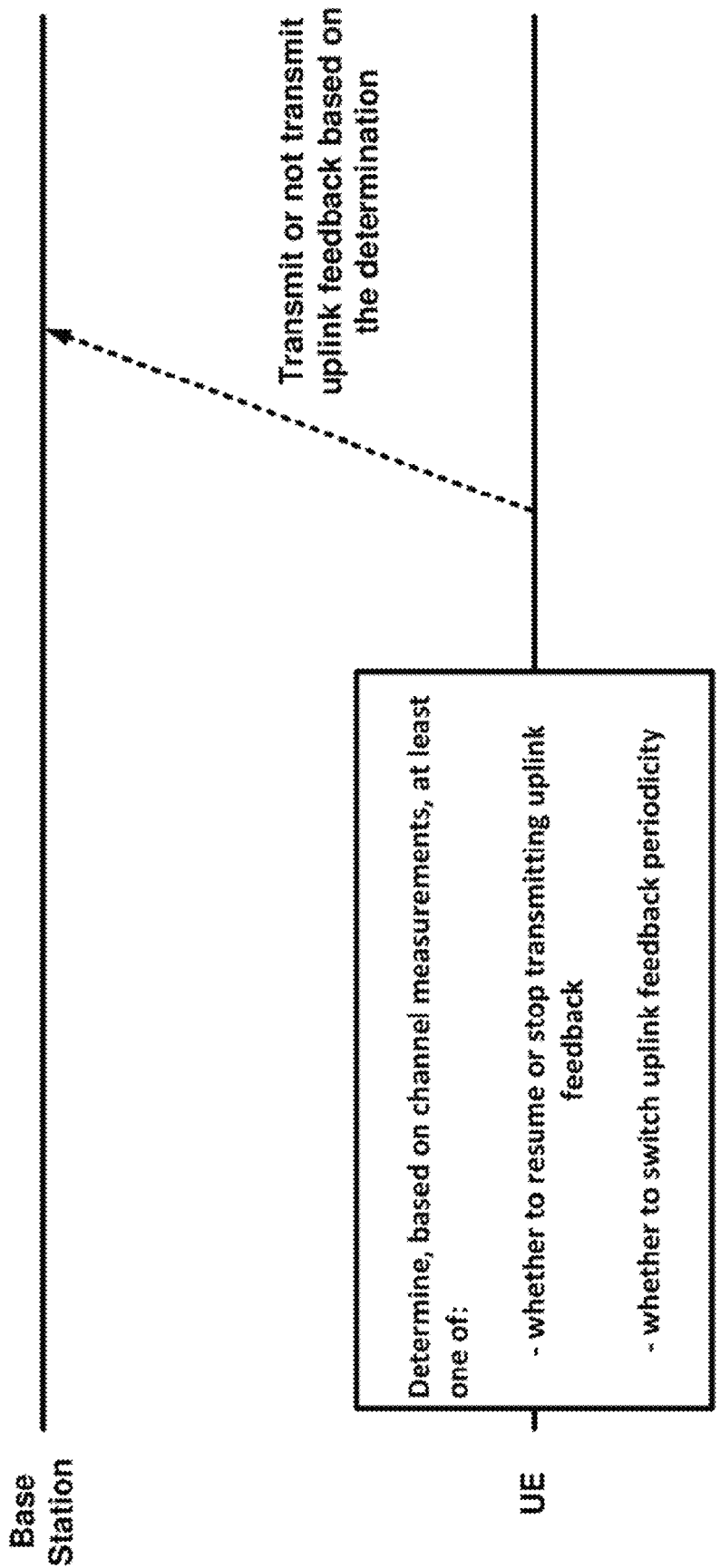
FIG. 19 shows an example process according to some aspects of some of various exemplary embodiments of the present disclosure.

In an example embodiment as shown in FIG. 19, a UE may use one or more processes for power saving when the UE is engaged in multicast broadcast services (MBS) communications and receives MBS data. The one or more processes for power saving may be based on an adaptive UE feedback (e.g., HARQ feedback, CSI reporting feedback, etc.) transmission, for example uplink feedback transmission in an RRC connected state. In an example, the uplink feedback transmission (e.g., HARQ feedback, CSI report, etc.) may be via a physical uplink control channel (PUCCH) or may be multiplexed in physical uplink shared channel (PUSCH). In an example, the uplink feedback may be associated with MBS communications and may be used by the base station for MBS scheduling and/or MBS data transmission to one or more UEs comprising the UE. The UE may adapt its uplink feedback periodicity, or the UE may determine whether to stop or resume uplink feedback transmission. The UE may determine at least one of: whether to resume transmitting or to stop transmitting uplink feedback associated with MBS data to the base station; and whether to switch a periodicity, e.g., switch from a first periodicity to a second periodicity, for example in a plurality of periodicities. In an example, the plurality of periodicities may be configurable, e.g., based on one or more configuration parameters (e.g., one or more RRC parameters). The determination to switch uplink feedback periodicity (e.g., according to the determined/selected/switched periodicity) or resume uplink feedback transmission or stop uplink feedback transmission may be based on channel measurement (e.g., at the UE or at the base station) or other factors (e.g., PHR, etc.) Based on the determination, the UE may transmit uplink feedback (e.g., according to the determined/selected/switched periodicity) or may resume uplink feedback transmission or may stop uplink feedback transmission.

In an example, the determination to switch periodicity of uplink feedback or to resume transmission of uplink feedback or to stop transmission of uplink feedback may be based on whether the channel condition (e.g., downlink condition and/or uplink channel condition) is improved or is degraded, e.g., based on the channel measurements. For example, the UE may use a robustness metric (e.g., RSRP, RSRQ, etc.) for determining whether the channel condition is improving or degrading. For example, in response to the channel measurements and/or the robustness metric indicating that the channel conditions is improving, the UE may increase the uplink feedback periodicity (e.g., less frequent uplink feedback) and may stop the uplink feedback if the channel measurements indicate improved channel conditions. For example, in response to the channel measurements and/or the robustness metric indicating that the channel conditions is degrading, the UE may reduce the uplink feedback periodicity (e.g., more frequent uplink feedback) and/or may resume the uplink feedback if the channel measurements and/or the robustness metric indicate improved channel conditions.

In an example, the channel measurements may be performed at the UE and the determination to switch the uplink feedback periodicity or the determination to resume uplink feedback or the determination to stop uplink feedback may be made autonomously at the UE and without a direct command from BS to switch uplink feedback periodicity or to resume uplink feedback or to stop uplink feedback. In an example, the UE may receive, from a BS, one or more configuration parameters indicating one or more triggering conditions. The determination to switch uplink feedback periodicity or to resume uplink feedback or to stop uplink feedback may be based on the channel measurements and the triggering conditions. The UE may evaluate/monitor the triggering conditions and the UE may make the determinations based on evaluating/monitoring the triggering conditions. The triggering conditions may comprise comparing a robustness metric (e.g., a reference signal received power (RSPR), or a reference signal received quality (RSRQ) or a remaining battery life of the UE) with one or more threshold. For example, the triggering conditions may comprise comparing a RSRP with a first threshold or comparing an RSRQ with a second threshold or comparing the remaining battery life with a third threshold. The UE may determine the robustness metric (e.g., RSRP or RSRQ) based on one or more reference signals. The UE may receive configuration parameters of the one or more reference signals. In an example, the wireless device may receive configuration parameters indicating the first threshold, the second threshold or the third threshold. In an example, the UE may transmit an indication (e.g., via PUCCH, RRC, etc.) to the BS indicating that the UE has switched uplink feedback periodicity or that the UE has resumed uplink feedback transmission or that the UE has stopped uplink feedback transmission.

In an example, the UE may make the determination to switch uplink feedback periodicity or that the UE may resume uplink feedback periodicity or that the UE may stop uplink feedback periodicity based on an indication/command from the BS. The UE may receive the indication/command via downlink signaling (e.g., RRC signaling and one or more RRC messages). In an example, the channel measurements may be performed at the BS, for example, based on SRS measurements or CSI report. In an example, the transmission of the indication/command from the BS to the UE may be based on PHR transmitted by the UE to the BS and/or based on based on the level of uplink loading or signaling congestion and/or based on radio resource management (RRM) measurements.

In an example, the UE may receive configuration parameters of a plurality of PUCCH resource sets. A first PUCCH resource set, in the plurality of PUCCH resource sets, may be associated with a first periodicity. In response to a determination to switch the uplink feedback periodicity to the first periodicity or selecting/determining the first periodicity (e.g., autonomous determination at the UE or determination at the UE based on a command from the BS), the UE may use the first PUCCH resource set for transmission of the uplink feedback.

In an example, the UE may receive configuration parameters of a PUCCH configuration indicating a plurality of PUCCH resources. In response to a determination to switch the uplink feedback periodicity to the first periodicity or selecting/determining the first periodicity (e.g., autonomous determination at the UE or determination at the UE based on a command from the BS), the UE may select first PUCCH resources from the plurality of PUCCH resources. The selection of the first PUCCH resources from the plurality of PUCCH resources may be to achieve the determined first periodicity. For example, the UE may select one PUCCH resource out of every N PUUCH resources and N may be such that the periodicity of uplink feedback is the first periodicity.

Figure 20:
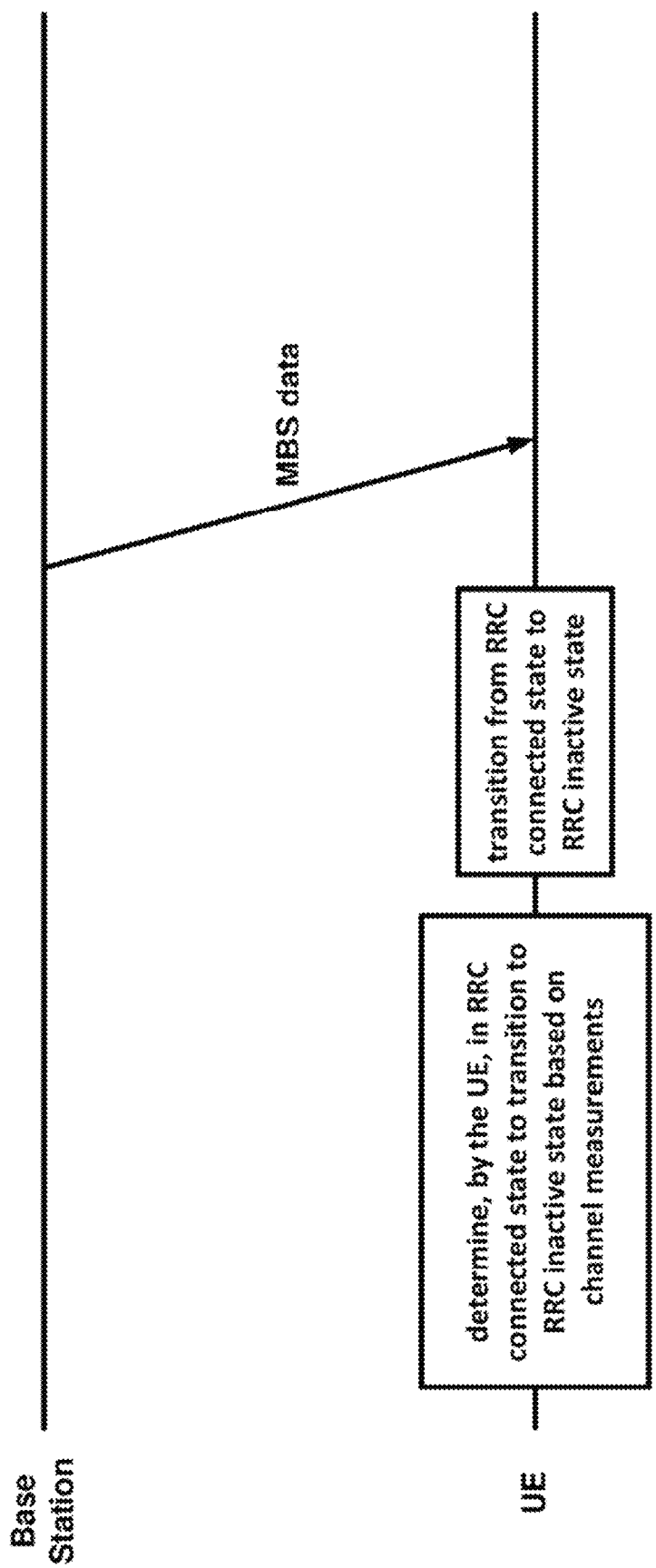
FIG. 20 shows an example process according to some aspects of some of various exemplary embodiments of the present disclosure.

In an example embodiment as shown in FIG. 20, a UE may use one or more processes for power saving when the UE is engaged in multicast broadcast services (MBS) communications and receives MBS data. The UE may be in an RRC connected state. The UE may determine to transition from the RRC connected state to an RRC inactive state for reception of MBS data. The determination to transition the RRC state may be based on channel measurements. In response to the determination, the UE may transition from the RRC connected state to the RRC inactive state and may receive the MBS data in the RRC inactive state.

In an example, the UE may receive one or more configuration parameters for determining one or more robustness metrics (e.g., RSRP, RSRQ, remaining battery power/life, etc.) and one or more triggers (e.g., one or more thresholds). The UE may determine to transition the RRC state, from the RRC connected state to the RRC inactive state, based on the one or more robustness metric and the one or more triggers. For example, the UE may determine to switch from the RRC connected state to the RRC inactive state based on comparing the one or more robustness metrics and the one or more thresholds. For example, comparing the one or more robustness metrics with the one or more thresholds may indicate improving/good channel conditions and the UE may transition to the RRC inactive state based on the comparing/determination.

In an example, the determination to transition from the RRC connected state to the RRC inactive state may be made at the UE, for example based on an indication/command from the BS. The UE may receive the indication/command via downlink control signaling (e.g., via one or more RRC messages, a MAC CE, DCI, etc.). In an example, the channel measurements may be made at the BS and may be based on one of a SRS measurement, CSI report, etc. In an example, the determination/command/indication may further be based on a PHR transmitted by the UE to the BS and/or uplink loading and/or signaling congestion.

In an example, the UE may further determine to transition from the RRC inactive state to an RRC connected state. The UE may transition from the RRC inactive state to the RRC connected state in response to the determination and may receive MBS data in the RRC connected state after the transitioning. In an example, the UE may receive one or more first parameters for determining one or more robustness metrics (e.g., RSRP, RSRQ, remaining battery power/life, etc.) and one or more triggers (e.g., one or more thresholds). The UE may determine to transition the RRC state, from the RRC inactive state to the RRC connected state, based on the one or more robustness metric and the one or more triggers. For example, the UE may determine to switch from the RRC inactive state to the RRC connected state based on comparing the one or more robustness metrics and the one or more thresholds. For example, comparing the one or more robustness metrics with the one or more thresholds may indicate degrading/bad channel conditions and the UE may transition to the RRC connected state based on the comparing/determination. The UE may start transmitting uplink feedback in the RRC connected state (or transmitting uplink feedback with a higher frequency) after transitioning to the RRC connected state.

In an embodiment, a user equipment (UE) may determine based on channel measurements, at least one of: whether to resume transmitting or to stop transmitting uplink feedback associated with MBS data; and whether to switch a periodicity associated with the uplink feedback. The UE may transit or may stop transmission of the uplink feedback based on the determination.

In some embodiments, the uplink feedback may be one of hybrid automatic repeat request (HARQ) feedback or channel state information (CSI) report.

In some embodiments, transmitting the uplink feedback may be based on a physical uplink control channel (PUCCH).

In some embodiments, the user equipment (UE) may be in a radio resource control (RRC) connected state.

In some embodiments, the UE may switch to a higher uplink feedback periodicity in response to a channel robustness metric indicating improved channel conditions based on the channel measurements.

In some embodiments, the UE may switch to a lower uplink feedback periodicity in response to a channel robustness metric indicating degraded channel conditions based on the channel measurements.

In some embodiments, the UE may stop the uplink feedback in response to a channel robustness metric indicating improved channel conditions based on the channel measurements.

In some embodiments, the UE may resume uplink feedback in response to a channel robustness metric indicating degraded channel conditions based on the channel measurements.

In some embodiments, the channel robustness metric may comprise one of a received signal received power (RSRP) and received signal received quality (RSRQ).

In some embodiments, the channel measurements may be performed at the user equipment (UE); and the determination may be autonomously made at the UE. In some embodiments, the UE may receive from a base station (BS), one or more configuration parameters indicating one or more triggering conditions, wherein the determination may be based on the channel measurements and the one or more triggering conditions. In some embodiments, the one or more triggering conditions are based on at least one of: comparing a received signal received power (RSRP) with a first threshold; comparing a received signal received quality (RSRQ) with a second threshold; and comparing an expected battery life of the user equipment (UE) with a third threshold. In some embodiments, the one or more configuration parameters may indicate at least one of the first threshold, the second threshold ad the third threshold. In some embodiments, the UE may monitor for the one or more triggering conditions. In some embodiments, the monitoring may comprise measuring one or more reference signals. In some embodiments, the UE may receive reference signal configuration parameters of the one or more reference signals. In some embodiments, the UE may transmit to a base station (BS), an indication of the determination to switch the periodicity of the uplink feedback or stopping transmission of the uplink feedback or resuming transmission of the uplink feedback. In some embodiments, the UE may transmit the indication via a physical uplink control channel. In some embodiments, the UE may transmit the indication via a radio resource control (RRC) message.

In some embodiments, the determination may be made at the user equipment (UE) based on an indication from a base station (BS). In some embodiments, the UE may receive the indication via downlink signaling. In some embodiments, the downlink signaling may be based on one or more radio resource control (RRC) messages. In some embodiments, the channel measurements may be least based on one of sounding reference signal (SRS) measurement and channel state information (CSI) report. In some examples, the determination may further be based on a power headroom report (PHR). In some examples, the determination may further be based on at least one of uplink loading and signaling congestion. In some examples, the channel measurements may comprise radio resource management (RRM) measurements.

In some embodiments, the UE may receive configuration parameters of a plurality of sets of physical uplink control channel (PUCCH) resource sets, wherein a first PUCCH resource set, in the plurality of PUCCH resource sets, may be associated with a first periodicity. In some embodiments, the UE may transmit the uplink feedback via the first PUCCH resource set based on a determination to switch an uplink feedback periodicity to the first periodicity.

In some embodiments, the UE may receive configuration parameters of physical uplink control channel (PUCCH), wherein: the configuration parameters indicate a plurality of PUCCH resources; and transmitting the uplink feedback comprises selecting first PUCCH resources, of the PUCCH resources, based on a determined periodicity of the uplink feedback. In some embodiments, selecting the first physical uplink control channel (PUCCH) resources may comprise selecting one out of every N PUCCH resource associated with the configuration parameters of the PUCCH; and N may be based on the determined periodicity of the uplink feedback.

In an embodiment, a user equipment (UE) in a radio resource control (RRC) connected state may determine to transition to an RRC inactive state for reception of MBS data, wherein the determining may be based on channel measurements. The UE may transition to the RRC inactive state in response to the determining. The UE may receive the MBS data in the RRC inactive state.

In some embodiments, the UE may receive from a base station (BS), one or more first configuration parameters for determining one or more robustness metrics; and one or more triggers. The UE may determine to transition to the RRC inactive state based on the one or more robustness metrics and the one or more triggers. In some embodiments, the one or more triggers may comprise one or more first thresholds; and determining to transition to the RRC inactive state may be based on comparing the one or more robustness metrics with the one or more first thresholds. In some embodiments, the one or more robustness metrics may comprise at least one of received signal received power (RSRP) and received signal received quality (RSRQ).

In some embodiments, the determination may be made at the user equipment (UE) based on an indication from the BS. In some embodiments, the UE may receive the indication via downlink signaling. In some embodiments, the downlink signaling may be based on one or more radio resource control (RRC) messages.

In some embodiments, the channel measurements may be at least based on one of sounding reference signal (SRS) measurement and channel state information (CSI) report.

In some embodiments, the determination may further be based on a power headroom report (PHR).

In some embodiments, the determination may further be based on at least one of uplink loading and signaling congestion.

In some embodiments, the channel measurements may comprise radio resource management (RRM) measurements.

In some embodiments, the (UE) in the radio resource control (RRC) inactive state may determine to transition to the RRC connected state for reception of MBS data, wherein the determining may be based on channel measurements. The UE may transition to the RRC inactive state in response to the determining. The UE may receive the MBS data in the RRC inactive state. In some embodiments, the UE may receive from the base station (BS): one or more first configuration parameters for determining one or more robustness metrics; and one or more triggers. The UE may determine to transition to the RRC connected state based on the one or more robustness metrics and the one or more triggers. In some embodiments, the one or more triggers may comprise one or more second thresholds; and determining to transition to the RRC connected state may be based on comparing the one or more robustness metrics with the one or more second thresholds. In some embodiments, the one or more second thresholds may be smaller than one or more first thresholds used in determination of transitioning from the RRC connected state to the RRC inactive state.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method of power saving in multicast broadcast services (MBS) communications, which realizes a power savings by limiting uplink feedback, the method comprising steps of:
   determining, by a user equipment (UE) and based on channel measurements, whether to resume transmitting paused uplink feedback or to stop transmitting uplink feedback associated with MBS data on a physical uplink control channel (PUCCH) and whether to switch a periodicity associated with the uplink feedback; and
   transmitting or stopping transmitting the uplink feedback based on the determining;
   wherein stopping transmitting results in the power savings.

2. The method of claim 1, wherein the uplink feedback comprises hybrid automatic repeat request (HARQ) feedback and a channel state information (CSI) report.

3. The method of claim 1, wherein the user equipment (UE) is in a radio resource control (RRC) connected state.

4. The method of claim 1, further comprising switching to a higher uplink feedback periodicity in response to a channel robustness metric indicating improved channel conditions based on the channel measurements.

5. The method of claim 1, further comprising switching to a lower uplink feedback periodicity in response to a channel robustness metric indicating degraded channel conditions based on the channel measurements.

6. The method of claim 1, wherein stopping the uplink feedback is further in response to a channel robustness metric indicating improved channel conditions based on the channel measurements.

7. The method of claim 1, wherein stopping the uplink feedback comprises resuming the uplink feedback is further in response to a channel robustness metric indicating degraded channel conditions based on the channel measurements.

8. The method of claim 1, wherein:
   the channel measurements are performed at the user equipment (UE); and
   the determining is autonomously made at the UE.

9. The method of claim 8, further comprising receiving, by the user equipment (UE) from a base station (BS), one or more configuration parameters indicating one or more triggering conditions, wherein the determining is based on the channel measurements and the one or more triggering conditions.

10. The method of claim 9, further comprising monitoring, by the user equipment (UE), for the one or more triggering conditions.

11. The method of claim 10, wherein the monitoring comprises measuring one or more reference signals.

12. The method of claim 1, wherein the determining is based on an indication from a base station (BS).

13. The method of claim 12, further comprising receiving the indication via downlink signaling.

14. The method of claim 13, wherein downlink signaling is based on one or more radio resource control (RRC) messages.

15. The method of claim 13, wherein the channel measurements are at least based on one of sounding reference signal (SRS) measurement and channel state information (CSI) report.

16. The method of claim 1, wherein the channel measurements comprise radio resource management (RRM) measurements.

17. A method of power saving in multicast broadcast services (MBS) communications, which realizes a power savings by limiting uplink feedback, the method comprising steps of:
   determining, by a user equipment (UE) and based on channel measurements and on at least one of uplink loading and signaling congestion, whether to resume transmitting paused uplink feedback or to stop transmitting uplink feedback associated with MBS data and whether to switch a periodicity associated with the uplink feedback; and
   transmitting or stopping transmitting the uplink feedback based on the determining,
   wherein the uplink feedback includes a channel state information (CSI) report; and
   wherein stopping transmitting results in the power savings.

18. A method of power saving in multicast broadcast services (MBS) communications, which realizes a power savings by limiting uplink feedback, the method comprising steps of:

determining, by a user equipment (UE) and based on channel measurements, whether to resume transmitting paused uplink feedback or to stop transmitting uplink feedback associated with MBS data and whether to switch a periodicity associated with the uplink feedback;

transmitting or stopping transmitting the uplink feedback based on the determining; and receiving configuration parameters of a plurality of sets of physical uplink control channel (PUCCH) resource sets, and wherein a first PUCCH resource set, in the plurality of PUCCH resource sets, is associated with a first periodicity;

wherein stopping transmitting results in the power savings.

19. The method of claim 18, wherein transmitting the uplink feedback is via the first PUCCH resource set based on determining to switch an uplink feedback periodicity to the first periodicity.

20. The method of claim 18, wherein the uplink feedback comprises hybrid automatic repeat request (HARQ) feedback and a channel state information (CSI) report.

* * * * *